(12) United States Patent
Chan

(10) Patent No.: US 7,463,822 B2
(45) Date of Patent: Dec. 9, 2008

(54) CAMERA WITH FILM CHAMBER FOR SELECTIVE LOADING OF FILM ROLL OR CARTRIDGE AND METHOD OF SELECTIVE LOADING

(75) Inventor: Yet Chan, Kowloon (HK)

(73) Assignee: Foster Assets Corporation (VG)

( * ) Notice: Subject to any disclaimer, the term of this patent is extended or adjusted under 35 U.S.C. 154(b) by 0 days.

(21) Appl. No.: 11/637,548

(22) Filed: Dec. 12, 2006

(65) Prior Publication Data

US 2007/0086760 A1    Apr. 19, 2007

Related U.S. Application Data

(62) Division of application No. 10/815,266, filed on Apr. 1, 2004, now Pat. No. 7,181,133.

(51) Int. Cl.
*G03B 17/02* (2006.01)
(52) U.S. Cl. .......................... 396/6; 396/538
(58) Field of Classification Search ................ 396/6, 396/388, 538; 242/348.1, 348.4
See application file for complete search history.

(56) References Cited

U.S. PATENT DOCUMENTS

| 2,940,232 A | 6/1960 | Wallace et al. |
| 3,276,714 A | 10/1966 | Steisslinger et al. |
| 3,347,142 A | 10/1967 | Steisslinger |
| 3,364,551 A | 1/1968 | Napor et al. |
| 3,364,552 A | 1/1968 | Napor et al. |
| 3,460,449 A | 8/1969 | Eagle |
| 3,482,681 A | 12/1969 | Nerwin et al. |
| 3,511,153 A | 5/1970 | Steisslinger et al. |
| 3,537,376 A | 11/1970 | Fleming et al. |
| 3,586,258 A | 6/1971 | Horlezeder |
| 3,742,586 A | 7/1973 | Butler et al. |
| 3,787,954 A | 1/1974 | Gade et al. |
| 4,260,231 A | 4/1981 | Kawarada |
| 4,318,602 A | 3/1982 | Yamanaka et al. |
| 4,524,920 A | 6/1985 | Kidawara et al. |
| 4,612,679 A | 9/1986 | Mitchell |

(Continued)

FOREIGN PATENT DOCUMENTS

CA    2236372    11/1998

(Continued)

*Primary Examiner*—W. B. Perkey
*Assistant Examiner*—Rishi S Suthar
(74) *Attorney, Agent, or Firm*—Akerman & Senterfitt

(57) ABSTRACT

A camera assembly includes an endcap assembly for closing off the bottom end of a second film chamber, which is sized to selectively receive a roll of film or a secondary film cartridge housing a roll of film. The endcap assembly can include a movable shutter blade enclosed between two plates. The endcap assembly can be removably secured to the camera assembly. At least a portion of the endcap assembly can be formed with the camera assembly. Embodiments further relate to a method of loading such cameras, especially in the daylight. The method involves bringing a sleeve into light-tight engagement with the endcap assembly and then inserting a winding rod through the sleeve and the endcap assembly and into a second film chamber of the camera. The winding rod can then be used to wind film out of a cassette in the first chamber and into a roll in the second chamber.

10 Claims, 16 Drawing Sheets

U.S. PATENT DOCUMENTS

| | | | |
|---|---|---|---|
| 4,666,276 | A | 5/1987 | Chan |
| 4,833,495 | A | 5/1989 | Ohmura et al. |
| 4,855,774 | A | 8/1989 | Ohmura et al. |
| 4,884,087 | A | 11/1989 | Mochida et al. |
| 4,954,857 | A | 9/1990 | Mochida et al. |
| D311,749 | S | 10/1990 | Chan |
| 4,972,649 | A | 11/1990 | Mochida et al. |
| 5,005,034 | A | 4/1991 | Chan |
| 5,016,033 | A | 5/1991 | Chan |
| D317,318 | S | 6/1991 | Chan |
| D320,610 | S | 10/1991 | Chan |
| 5,063,400 | A | 11/1991 | Takei et al. |
| D326,467 | S | 5/1992 | Chan |
| D331,067 | S | 11/1992 | Chan |
| RE34,168 | E | 1/1993 | Ohmura et al. |
| 5,235,364 | A | 8/1993 | Ohmura et al. |
| 5,296,887 | A | 3/1994 | Zander |
| D345,750 | S | 4/1994 | Arai |
| 5,311,231 | A | 5/1994 | Suzuki et al. |
| D348,076 | S | 6/1994 | Chan |
| 5,361,111 | A | 11/1994 | Yamashina et al. |
| 5,381,200 | A | 1/1995 | Takagai |
| 5,381,201 | A | 1/1995 | Chan |
| D356,101 | S | 3/1995 | Arai |
| 5,408,288 | A | 4/1995 | Ogura et al. |
| 5,436,685 | A | 7/1995 | Yamashina |
| 5,489,957 | A | 2/1996 | Weaver |
| D372,722 | S | 8/1996 | Isozaki |
| 5,565,945 | A | 10/1996 | Tobise et al. |
| 5,574,524 | A | 11/1996 | Petruchik |
| 5,619,298 | A | 4/1997 | Stiehler |
| 5,754,891 | A | 5/1998 | Chan |
| 5,790,906 | A | 8/1998 | Chan |
| 5,815,754 | A | 9/1998 | Balling et al. |
| 5,881,320 | A | 3/1999 | Balling |
| 5,899,584 | A | 5/1999 | Balling |
| 5,933,657 | A | 8/1999 | Watkins et al. |
| 6,009,276 | A | 12/1999 | Balling |
| 6,101,331 | A | 8/2000 | Watkins et al. |
| 6,223,002 | B1 | 4/2001 | Chan |
| 6,233,401 | B1 * | 5/2001 | Leung .................... 396/6 |
| 6,345,156 | B1 | 2/2002 | Isozaki et al. |
| 6,370,338 | B1 | 4/2002 | Chan |
| 6,404,990 | B2 | 6/2002 | Isozaki et al. |
| 6,427,050 | B1 | 7/2002 | Chan |
| 6,447,176 | B2 | 9/2002 | White et al. |
| 6,535,696 | B1 | 3/2003 | Chan |
| 6,587,645 | B1 | 7/2003 | Chan |
| 6,763,184 | B2 | 7/2004 | Chan |
| 6,763,189 | B2 | 7/2004 | Chan |
| 6,785,467 | B2 | 8/2004 | White et al. |
| 6,789,961 | B2 | 9/2004 | Chan |
| 7,039,306 | B2 | 5/2006 | White et al. |
| 7,226,223 | B2 | 6/2007 | Chan |
| 7,251,415 | B2 | 7/2007 | Chan |
| 2002/0044775 | A1 | 4/2002 | Chan |
| 2003/0007791 | A1 | 1/2003 | Chan |
| 2003/0072572 | A1 | 4/2003 | White et al. |
| 2003/0210905 | A1 | 11/2003 | Chan |
| 2004/0062544 | A1 | 4/2004 | Chan |
| 2004/0170416 | A1 | 9/2004 | Chan |
| 2005/0008357 | A1 | 1/2005 | White et al. |
| 2005/0084257 | A1 | 4/2005 | Chan |
| 2005/0117901 | A1 | 6/2005 | Chan |
| 2006/0268114 | A1 | 11/2006 | Chan et al. |
| 2007/0172232 | A1 | 7/2007 | White et al. |

FOREIGN PATENT DOCUMENTS

| | | |
|---|---|---|
| EP | 0 561 636 A1 | 9/1993 |
| EP | 0 875 783 A1 | 11/1998 |
| EP | 0 962 811 A1 | 12/1999 |
| EP | 1 122 589 A1 | 8/2001 |
| EP | 1 122 591 A1 | 8/2001 |
| EP | 1 455 221 A2 | 9/2004 |
| EP | 1 720 336 A1 | 11/2006 |
| GB | 2 135 072 A | 8/1984 |
| GB | 2 170 617 A | 8/1986 |
| GB | 2 207 828 A | 2/1989 |
| GB | 2 227 849 A | 8/1990 |
| GB | 2 230 615 A | 10/1990 |
| GB | 2 231 165 A | 11/1990 |
| GB | 2 243 697 A | 11/1991 |
| GB | 2 265 225 A | 9/1993 |
| GB | 2 277 163 A | 10/1994 |
| GB | 2 349 704 A | 8/2000 |
| JP | SHO 48-46622 | 10/1973 |
| JP | SHO 53-127934 | 10/1978 |
| NE | 6708486 | 6/1967 |
| TW | 020241 | 8/1996 |
| TW | 436660 B | 5/2001 |
| WO | WO99/60442 | 11/1999 |

* cited by examiner

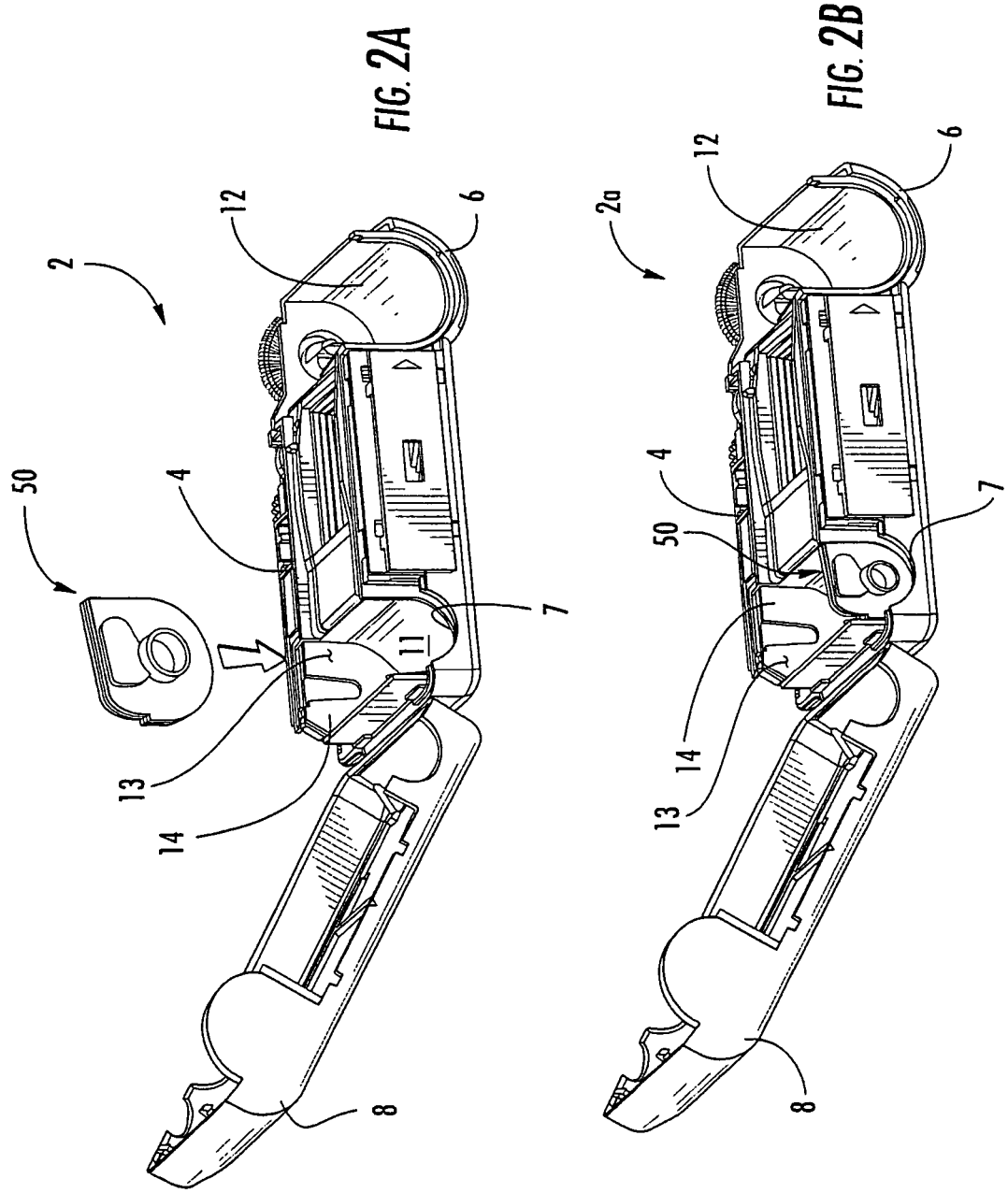

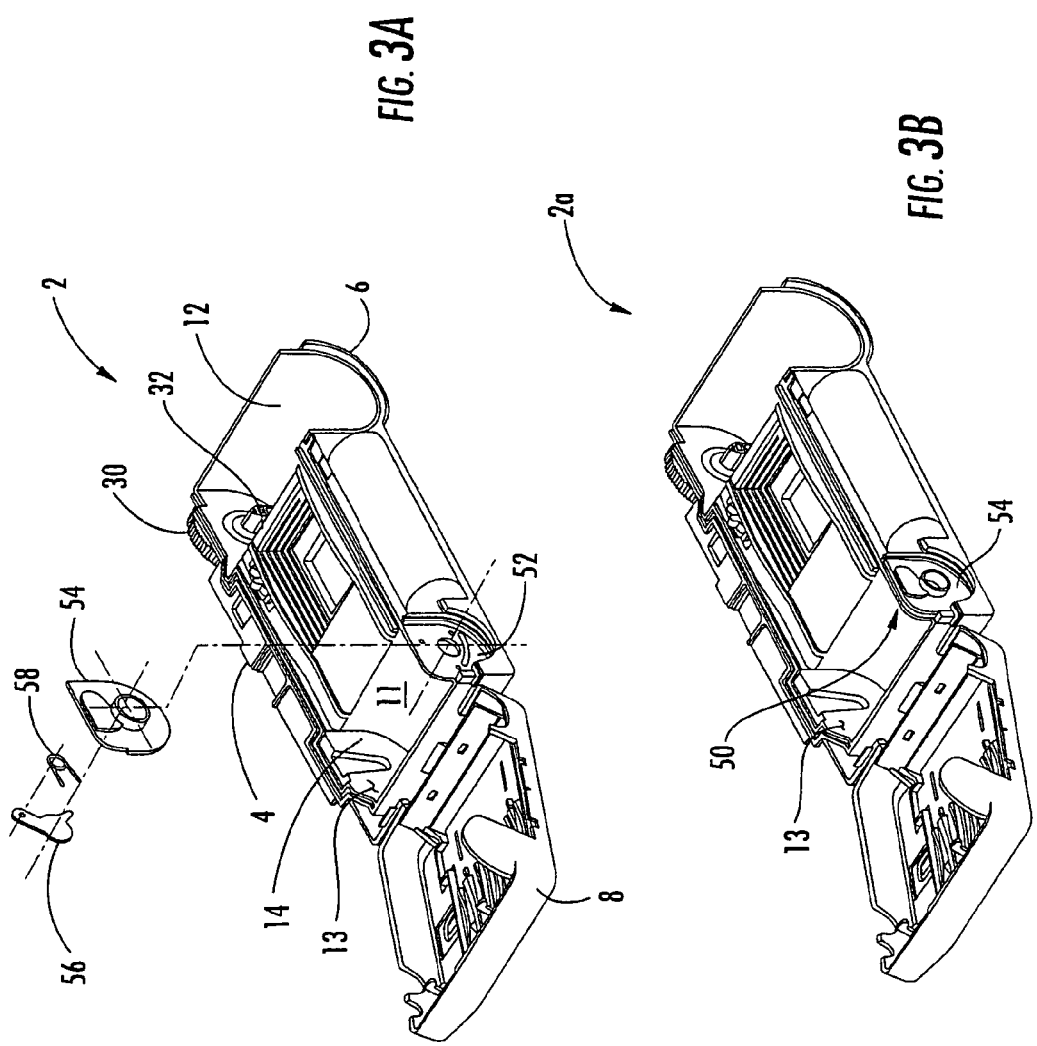

CAMERA WITH FILM CHAMBER FOR SELECTIVE LOADING OF FILM ROLL OR CARTRIDGE AND METHOD OF SELECTIVE LOADING

CROSS-REFERENCE TO RELATED APPLICATIONS

This application is a divisional of U.S. application Ser. No. 10/815,266, filed Apr. 1, 2004.

STATEMENT REGARDING FEDERALLY SPONSORED RESEARCH OR DEVELOPMENT (Not Applicable)

FIELD OF THE INVENTION

The invention relates in general to cameras and, more particularly, to a camera assembly configured to facilitate film loading and an associated film loading method.

BACKGROUND OF THE INVENTION

In recent years, cameras known as disposable cameras, single-use cameras or lens-fitted photographic film packages have become increasingly popular. Such cameras are of relatively simple construction and are low cost. In addition, these types of cameras are usually pre-loaded with film by the manufacturer. In some cameras, the film can be arranged such that the film is unwound from a standard film cassette or cartridge during the assembly of the camera. Thus, as pictures are sequentially taken, the film can be wound back into the cassette by the user. When the user is finished with the film, the user can return the entire camera to a photo processor to have the film developed. With the empty cameras, the manufacturer can discard the camera in its entirety, reload the camera if it is still operational, or salvage individual components of the camera. Alternatively, the user can remove the exposed film from the camera and only take the film to a photo processor. In such case, the user can reload the camera with a new roll of film.

One consideration with such cameras is the ease of loading of the film, particularly for those cameras in which the film must be wound out of a film cassette before use. In view of the low cost of the camera itself, costs associated with the manufacture and assembly of the camera are also important, including the cost of loading the film into the camera at the factory. It is highly desirable to utilize a method which is simple and cheap and yet reliable. It is also highly desirable if the camera is configured to facilitate reloading by an end user.

Thus, there is a need for a camera assembly that can facilitate film loading by a manufacturer or a user. Further, there is a need for a method of loading such a film assembly. Further, there is a need for a loading method that can be performed in the daylight or under lighted conditions.

SUMMARY OF THE INVENTION

In one respect, embodiments of the invention relate to a camera including a main body, an endcap assembly and a back cover. The main body supports a taking lens and a closeable exposure aperture. Further, the main body defines a cartridge chamber and a film chamber disposed on opposite sides of the exposure aperture. The back cover operatively engages the main body to enclose the chambers light-tightly therein.

The film chamber is defined at an upper end by an upper wall of the main body and at a lower end by the endcap assembly. The film chamber is sized to selectively receive either a roll of film or a secondary cassette housing a roll of film light-tightly therein. The upper wall and an inner face of the endcap assembly of the film chamber can be substantially smooth. Further, the upper wall and the inner face of the endcap assembly of the film chamber each can define a plane. In one embodiment, these planes can spaced at least about 36.7 millimeters apart; in another embodiment, these planes can be spaced at least about 35.2 millimeters apart.

The endcap assembly includes a shutter support plate with an aperture extending therethrough, and a shutter blade movably mounted on the shutter support plate. The shutter blade is movable between a first position, in which the aperture is substantially closed, and a second position, in which the aperture is substantially unobstructed. Thus, a shaft can pass through the endcap assembly and into the film chamber for winding of film into the film chamber. The shutter support plate can include a collar that substantially peripherally surrounds the aperture and extends therefrom. At least a portion of the shutter support plate of the endcap assembly can be formed with either the main body or the back cover. In one embodiment, the endcap assembly can be removably mounted on the main body. In such an instance, the main casing can provide a cradle at the lower end of the film chamber on which the endcap assembly can be mounted.

The endcap assembly can further include a second shutter support plate with an aperture extending therethrough. The apertures in the shutter support plate and the second shutter support plate can be substantially aligned, thereby allowing a shaft to pass simultaneously through the apertures in both shutter support plates of the endcap assembly and into the film chamber for winding of film into the film chamber. The shutter blade can be disposed between the two shutter support plates such that, in the first position, both apertures are substantially closed and, in the second position, both apertures are substantially unobstructed. The endcap assembly can further include a spring for biasing the shutter blade into the first position.

When the endcap assembly includes two shutter support plates, at least a portion of one of the shutter support plates can be formed with the main body or with the back cover. In one embodiment, one of the shutter support plates can be made of at least two pieces: one piece can be formed with the main body and another piece can be formed with the back cover. Thus, when the back cover is mounted on the front cover, the first and second piece can engage to form one of the shutter support plates of the endcap assembly.

The cartridge chamber can be sized to selectively receive either a 35 millimeter film cartridge or a primary cassette of a DCS film system. Thus, the camera can further include either a 35 millimeter film cartridge or a primary cartridge of a DCS film system disposed in the cartridge chamber. The cartridge can contain at least one end of a roll of film light-tightly therein. At least a portion of the film extending from the 35 millimeter film cartridge can be wound in a roll in the film chamber. In one embodiment, the roll can be housed light-tightly within a secondary cassette. A lower side of the secondary cassette can contact the endcap assembly of the film chamber. Alternatively, a lower side of the secondary cassette can be substantially adjacent to or spaced from the endcap assembly of the film chamber.

Another camera assembly according to embodiments of the invention includes a main body, an endcap assembly, and a back cover. The main body supports a taking lens and a closeable exposure aperture. The main body defines a cartridge chamber and a film chamber disposed on opposite sides of the exposure aperture. The back cover operatively engages the main body to enclose the chambers light-tightly therein. The film chamber is defined at an upper end by an upper wall of the main body and at a lower end by an endcap assembly. The upper wall and the lower wall of the film chamber can be substantially smooth. The upper wall defines an upper plane and an inner face of the endcap assembly defines a lower plane; the upper and lower planes are spaced from about 36.7 millimeters to about 37.7 millimeters apart.

The endcap assembly includes a shutter support plate with an aperture extending therethrough. At least a portion of the shutter support plate can be formed with the main body or the back cover. The shutter support plate can include a collar that substantially peripherally surrounds the aperture and extends therefrom. Further, the endcap assembly includes a shutter blade movably mounted on the shutter support plate. The shutter blade is movable between a first position, in which the aperture is substantially closed, and a second position, in which the aperture is substantially unobstructed. Thus, a shaft can pass through the endcap assembly and into the film chamber for winding of film in the film chamber. The shutter blade can be biased into the first position by a spring, for example.

In one embodiment, the endcap assembly can further include a second shutter support plate with an aperture extending therethrough. The apertures in the two shutter support plates can be substantially aligned. Accordingly, a shaft can simultaneously pass through the apertures in both shutter support plates of the endcap assembly and into the film chamber for winding of film into the film chamber. In the case of two shutter support plates are provided, the shutter blade can disposed between the two shutter support plates such that, in the first position, both apertures are substantially closed and, in the second position, both apertures are substantially unobstructed. The endcap assembly can further include a spring for biasing the shutter blade into the first position.

At least a portion of one of the shutter support plates of the endcap assembly can be formed with either the main body or the back cover. In one embodiment, one of the shutter support plates of the endcap assembly can be made of at least two pieces. For instance, one piece can be formed with the main body and another piece can be formed with the back cover. Thus, when the back cover is mounted to the main body, the first and second piece can engage each other so as to form one of the shutter support plates. In another embodiment, the endcap assembly can be removably mounted on the main body. To that end, the main casing can provide a cradle at the lower end of the film chamber on which the endcap assembly can be mounted.

Still other aspects according to the invention relate to a camera assembly with an improved film chamber. The camera includes a main body supporting a taking lens and a closeable exposure aperture. The main body defines a cartridge chamber and a film chamber disposed on opposite sides of the exposure aperture. The film chamber is defined at an upper end by an upper wall of the main body and at a lower end by an endcap assembly. The endcap assembly includes a movable shutter blade mounted to a shutter support plate having a closeable aperture. The camera also includes a back cover operatively engaging the main casing to enclose the chambers light-tightly therein. In such a camera, the improvement according to the invention can include the film chamber being sized between the upper wall and the endcap assembly to selectively receive either a roll of film or a secondary cassette housing a roll of film light-tightly therein.

Aspects of the invention also relate to a method of loading film into a camera assembly. The method includes providing a camera assembly, including any of the previously described camera assemblies. If the camera includes an endcap assembly that can be removably mounted on the main body, the method can include the step of mounting the endcap assembly onto the main body.

A substantially light-tight sleeve and a winding rod are provided. The sleeve has a proximal end and a distal end and a longitudinal axis extending therebetween. Similarly, the winding rod has a proximal end and a distal end. At least the distal end of the winding rod extends substantially light-tightly into the sleeve from the proximal end of the sleeve. The winding rod is movable within the sleeve substantially along the longitudinal axis of the sleeve.

The distal end of the sleeve is placed light-tightly about the aperture in the endcap assembly. The shutter blade is moved into the second position. The distal end of the winding rod is moved through the sleeve as well as the aperture in the endcap assembly. At least a portion of the distal end of the winding rod extends into the film chamber of the camera assembly.

A film cartridge is placed into the cartridge chamber of the camera assembly. A leader portion of film extending from the film cartridge is attached to the winding rod. The back cover is operatively engaged with the main body so as to light-tightly enclose the film chamber and the cartridge chamber. The winding rod is turned such that at least a portion of film from the cartridge is wound into a roll in the film chamber. The turning step can be performed by either hand or electric motor. The method can further include the step of disengaging a film advance wheel on the main body so as to allow the film to be wound out of the film cartridge and into the film chamber. The winding rod is disengaged from the leader portion of film and the winding rod is retracted from the film chamber and the endcap assembly.

The shutter blade is moved into the first position. In some embodiments, the shutter blade of the endcap assembly can be biased into the first position. In such case, the step of moving the shutter blade into the first position occurs because of such bias once the winding rod is retracted from the endcap assembly.

The shutter support plate can include a collar that substantially peripherally surrounds the aperture in the shutter support plate and extends therefrom. When such a collar is provided, the step of placing the distal end of the sleeve light-tightly about the aperture in the endcap assembly can include mounting the distal end of the sleeve to the collar. Further, the method can further include the step of inserting a plug into the collar.

Another method of loading film into a camera assembly. According to the method, a camera assembly is provided. The camera assembly has a main body and a back cover. The back cover operatively engages the main body so as to form in part a light-tight film casing. The light-tight film casing includes a cartridge chamber and a film chamber. The chambers are disposed on opposite sides of a taking lens supported on the main body. Each of the chambers is defined by at least the main body section and the back cover section. The film chamber is defined at an upper end by an upper wall of the main body and at a lower end by an endcap assembly. The endcap assembly includes at least a shutter support plate with an aperture extending therethrough and with a shutter blade mounted thereon. The shutter blade is movable between a first position, in which the aperture is substantially closed, and a second position, in which the aperture is substantially unobstructed.

A DCS film system is provided, which includes film, a primary cassette and a secondary cassette. At least a first portion of the film is housed within the primary cassette and a second portion of the film is housed within the secondary cassette. The primary cassette is inserted into the cartridge chamber; the secondary cassette is inserted into the film chamber between the upper wall and the endcap assembly. The back cover and the main body are operatively engaged so as to form a light-tight film casing, in which the DCS film system is enclosed light-tightly therein.

The film chamber can be sized such that, when the secondary cassette is inserted in the film chamber, the secondary cassette either: (a) contacts an inner face of the endcap assembly of the film chamber; (b) is substantially adjacent to an inner face of the endcap assembly of the film chamber; or (c) is spaced from an inner face of the endcap assembly of the film chamber.

BRIEF DESCRIPTION OF THE DRAWINGS

FIG. 2A is an isometric view of a camera assembly according to embodiments of the invention in which the endcap assembly is removable from the camera assembly.

FIG. 2B is an isometric view of a camera assembly according to embodiments of the invention, showing the endcap assembly installed in the camera assembly.

FIG. 3A is an isometric view of a camera assembly according to embodiments of the invention in which a portion of the endcap assembly is removable from the camera assembly and another portion of the endcap assembly is integral with the main body of the camera assembly.

FIG. 3B is an isometric view of a camera assembly according to embodiments of the invention, showing the endcap assembly installed in the camera assembly.

DETAILED DESCRIPTION OF EMBODIMENTS OF THE INVENTION

Aspects of the present invention relate to camera assemblies and associated methods of loading such camera assemblies. Embodiments according to aspects of the invention are shown in FIGS. 1-16, but the present invention is not limited to the illustrated structure or application. Further, the following detailed description is intended only as exemplary.

Figure 13:
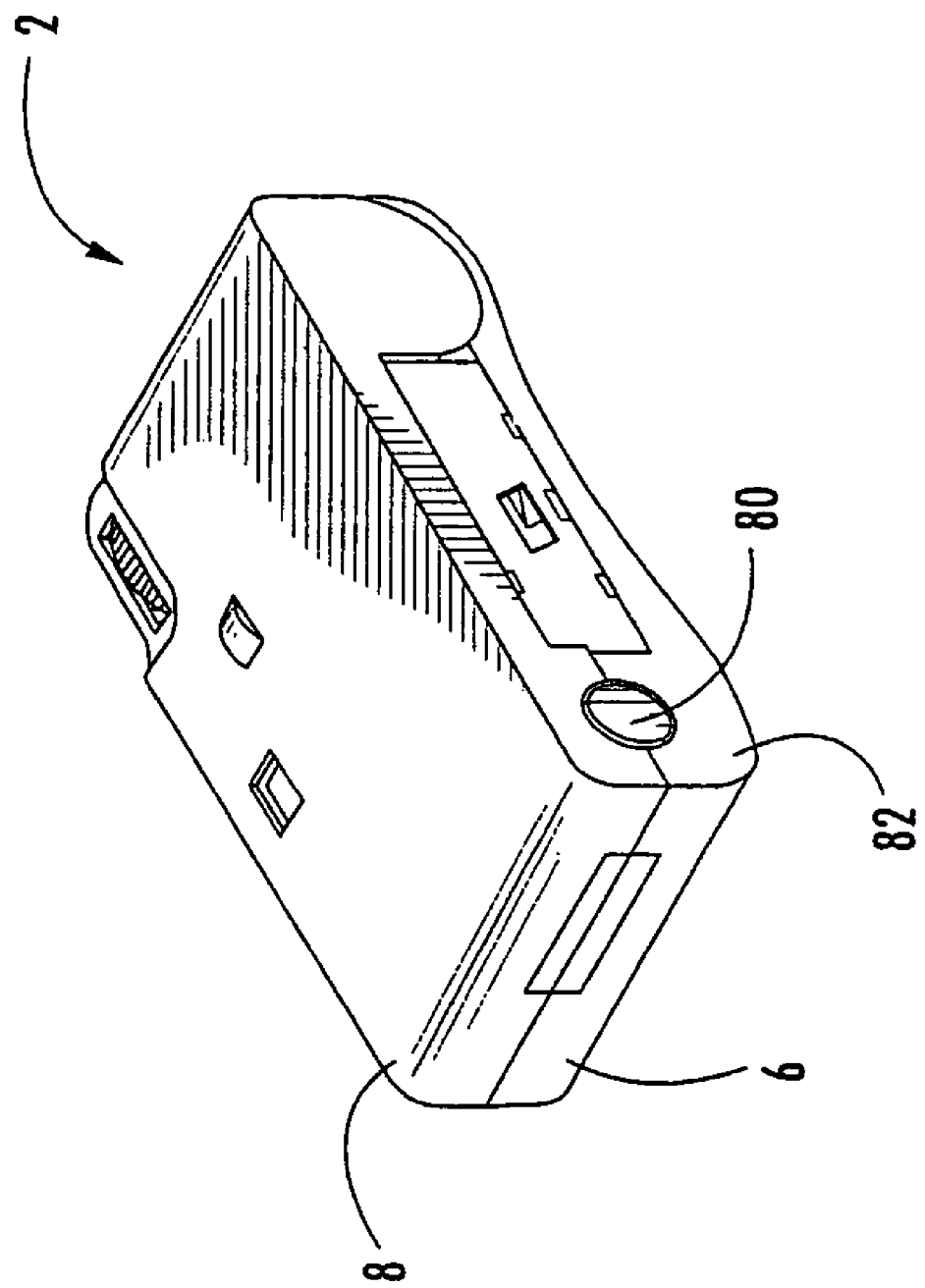
FIG. 13 is an isometric view of a camera assembly according to embodiments of the invention.

In one respect, embodiments of the invention relate to a camera assembly. One possible camera assembly 2 is shown in FIG. 13. The camera assembly 2 can be of the type in which film is wound back into a film cassette as pictures are taken. As shown in FIG. 2A, the camera assembly 2 can include a main body 4, a front cover 6 and back cover 8. In some embodiment, there may not be a front cover 6. The main body 4 can carry the majority of the operative components of the camera 2. The main body 4 can support a taking lens assembly (not shown), a front portion of which can extend through an aperture (not shown) in the front cover 6, and behind which is arranged a shutter assembly (not shown) as is entirely conventional and well understood by those skilled in the art.

A first chamber 12 can be defined at least in part by the main body 4 and the back cover 8. The first chamber 12 can receive a film-containing cassette or light-tight film cartridge, preferably a conventional 35 millimeter cartridge having a central rotatable spool on which the film is wound. With appropriate modification, other standard film formats can equally be accommodated within the first chamber 12. A second chamber 14 can be arranged on the opposite side of the camera 2. Like the first chamber 12, the second chamber 14 can be defined at least in part by the main body 4 and the back cover 8. In one embodiment, the second chamber 14 can be adapted, shaped, sized, and/or otherwise configured for selectively receiving either a roll of film or a secondary cassette housing a roll of film light-tightly therein, such as the secondary cassette a DCS film system, which is described later.

The second chamber 14 can include a curved surface 11 of the main body 4, bounded on its upper and lower ends by upper and lower endcaps 13,50, respectively. The terms "upper" and "lower" are used to indicate the relative position of the endcaps 13,50 of the second chamber 14 when the camera assembly 2 is held in its normal operational position. These terms are used to facilitate discussion and are not intended to limit the scope of the invention. An imaginary plane (not shown) can be associated with each of the endcaps 13,50, at least with respect to those portions that face toward the second chamber 14. For example, in one embodiment, no structure of the endcaps 13,50 extends beyond their associated planes. In other words, the endcaps 13,50 can have any of a number of surface features, such as protrusions, but the plane associated with that endcap will be spaced at the terminus of the farthest inwardly extending feature. Thus, no portion of the endcaps 13,50 will extend beyond its respective plane. The planes can be substantially parallel to each other. In one embodiment, the walls of the endcaps 13,50, at least those portions facing inward toward the second chamber 14, can be substantially smooth, substantially flat and/or substantially planar. In such case, the planes can be substantially co-planar with the walls of the endcaps 13,50. In either case, the endcaps 13,50 or planes defined thereby can be spaced to selectively receive one of a roll of film or a secondary cassette such as from a DCS-type film system, which can have lengths from about 36.5 millimeters to about 37.5 millimeters. In one embodiment, the planes can be spaced at least 35.2 millimeters apart and, more specifically, from about 36.7 millimeters to about 37.7 millimeters apart and, even more specifically, substantially 37 millimeters apart.

Figure 15:
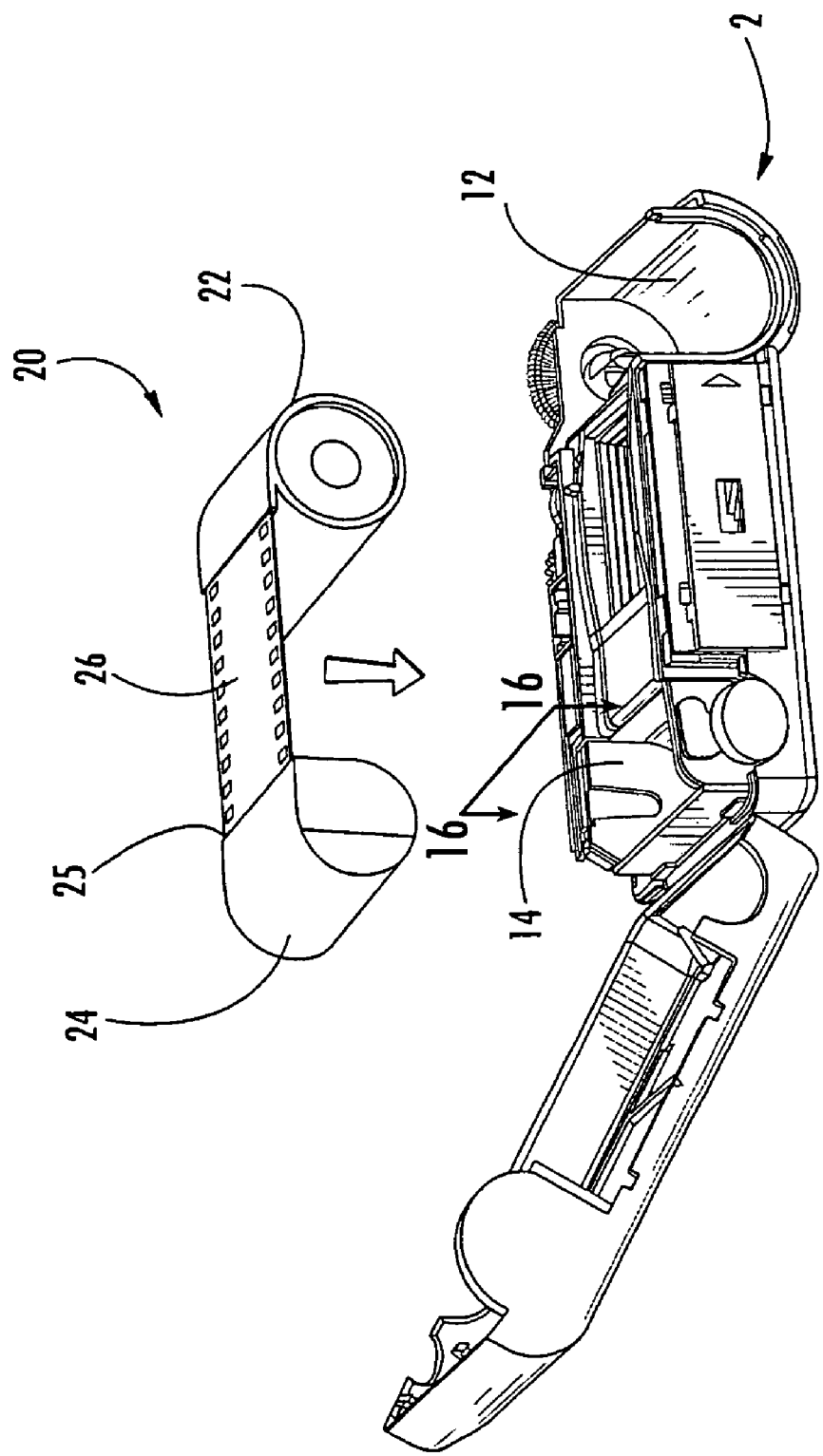
FIG. 15 is an is an isometric view of a DCS cartridge being inserted into a camera assembly according to embodiments of the invention.

The secondary film cassette or cartridge is part of a film system that is known in the art as a dual cassette system (DCS). One example of a DCS film system 20 is shown in FIG. 15. The DCS 20 can include a primary cassette or cartridge 22, which can be a standard 35 millimeter cartridge, and a secondary cassette or cartridge 24. It should be noted that the terms "primary" and "secondary" are used for convenience to facilitate discussion and are not intended to limit the scope of the invention. The secondary cassette 24 can be of similar general shape to a conventional film cassette or to the primary cassette 22. However, in contrast to the primary cassette 22, the secondary cassette 24 has no spool. The secondary cassette 24 can include a film slot 25 through which the film 26 can extend. Preferably, the secondary cassette 24 is provided with light-sealing features, such as opposed strips of velvet or similar soft material around the film slot 25 and similar to what is used in a conventional film cassette. Preferably, the secondary cassette 24 is not identical in size or shape to the primary cassette 22. For instance, the secondary cassette 24 can be smaller in size than the primary cassette 22 in order to ensure that the user does not try to load the primary and secondary cassettes 22,24 into the wrong film chambers 12,14 in the camera assembly 2.

With a new DCS film assembly 20, a substantial portion of the film 26 is already wound into the secondary cassette 24. The DCS assembly is advantageous because it can be loaded into a camera in the daylight. Also, the DCS film assembly 20 can be simply inserted into the camera 2 without the need for further manipulation of the film 26, such as winding the film out of the primary cassette 22. Again, DCS-type film is well known in the art.

Figure 5:
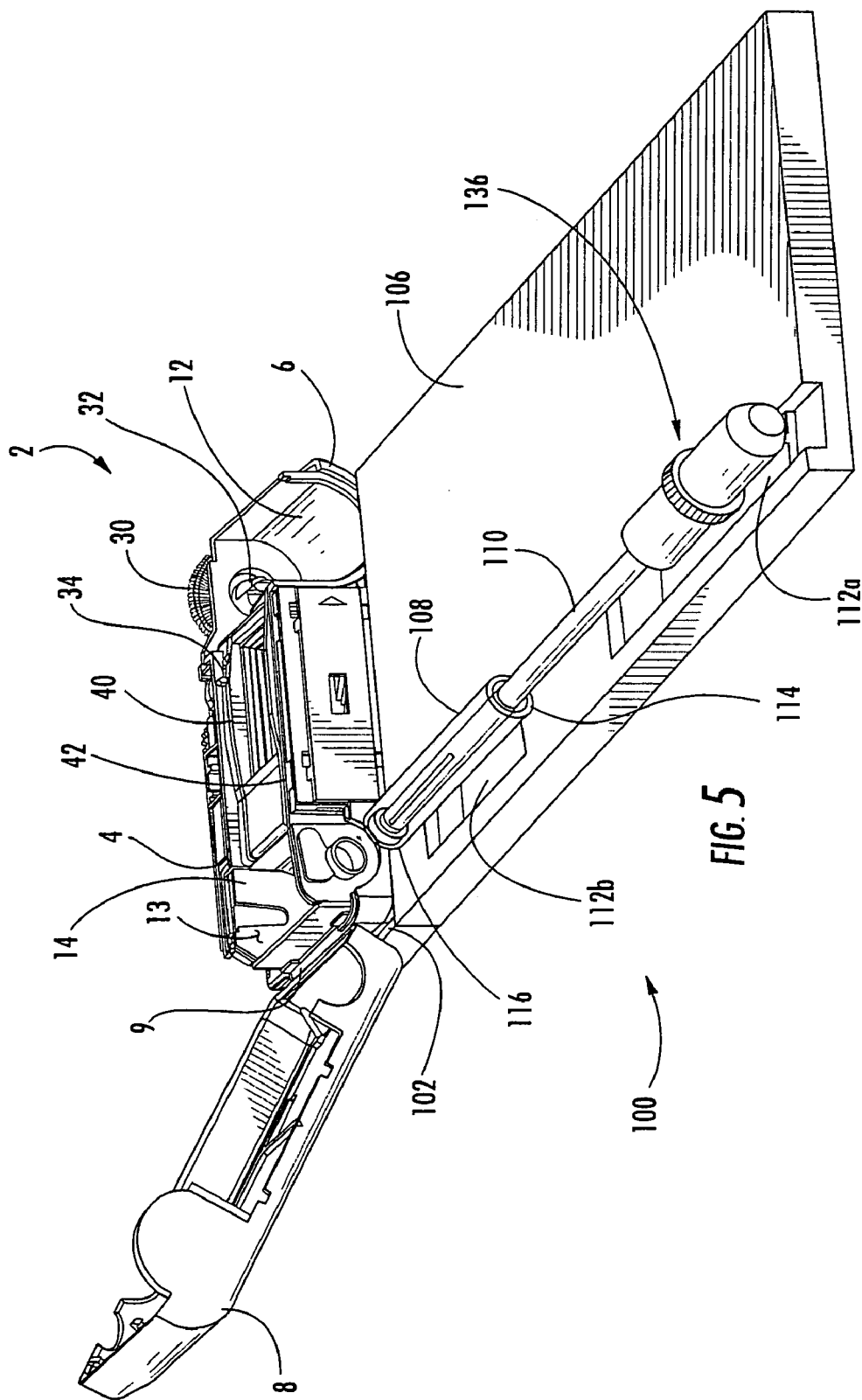
FIG. 5 is an isometric view of a camera assembly and a loading fixture according to embodiments of the invention.
Figure 6:
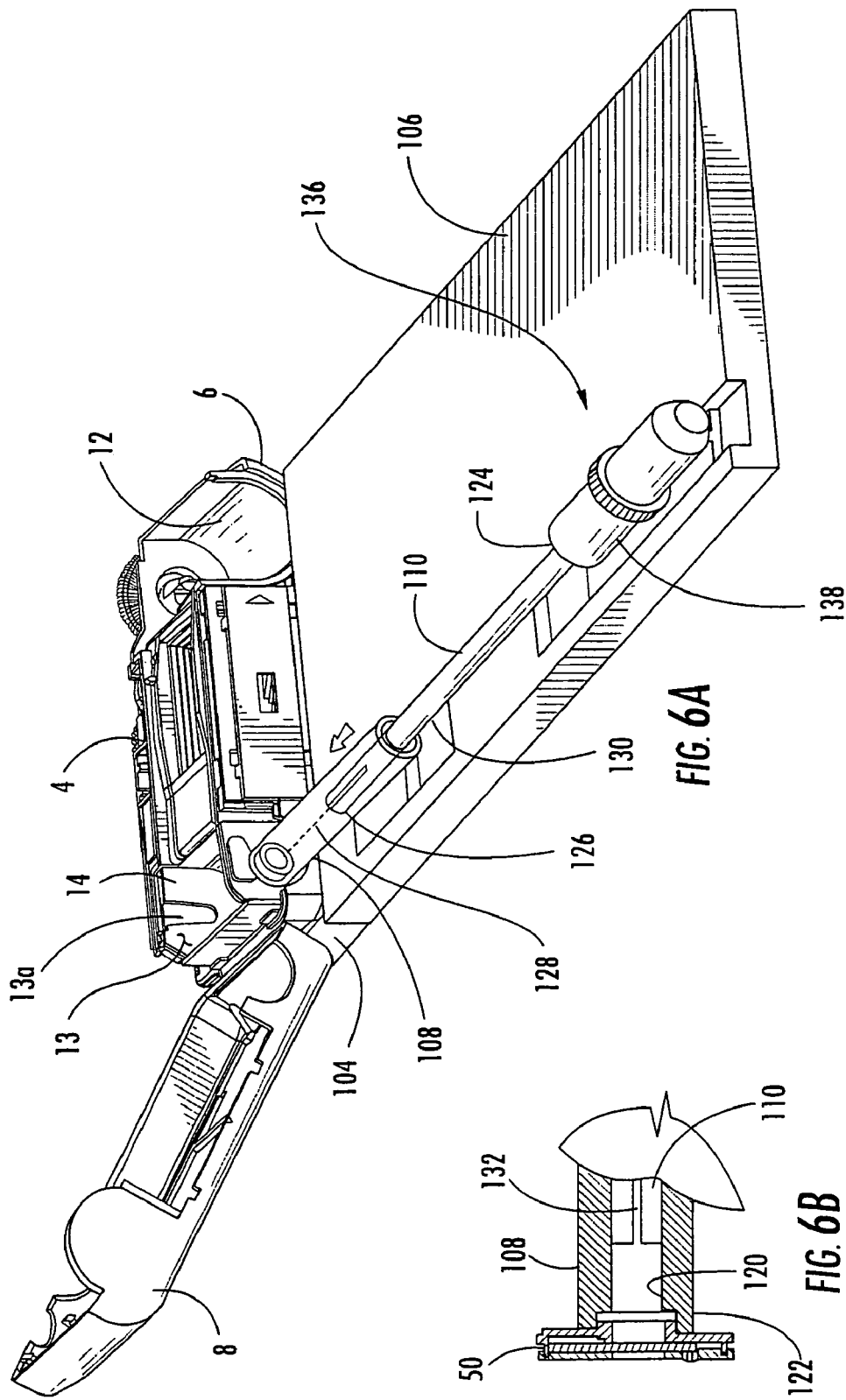
FIG. 6A is an isometric view of a camera assembly and a loading fixture according to embodiments of the invention, showing a sleeve on the fixture engaging a collar on an endcap assembly.
FIG. 6B is a partial cross-sectional view, showing the engagement between the sleeve and the collar.
Figure 7:
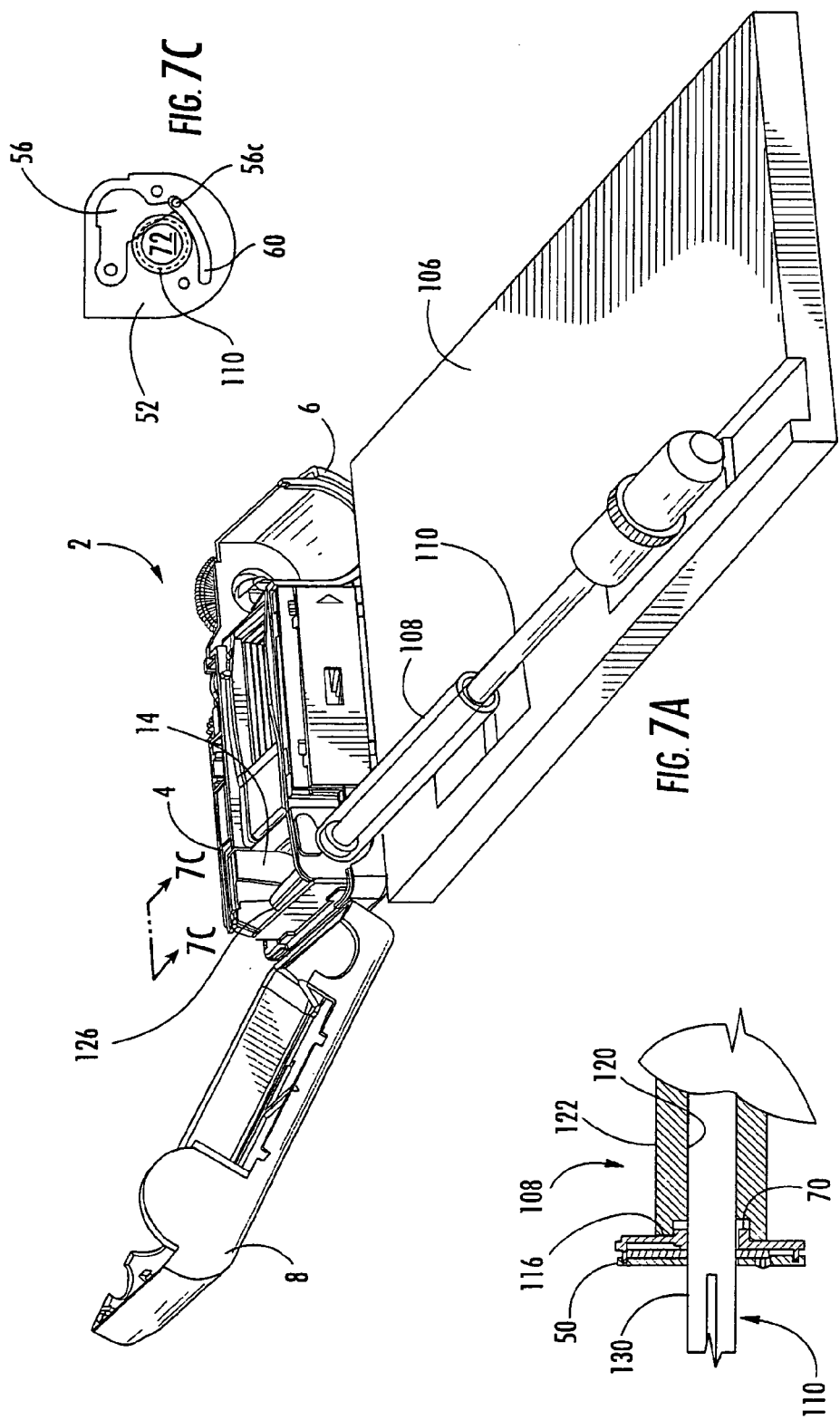
FIG. 7A is an isometric view of a camera assembly and a loading fixture according to embodiments of the invention, showing a portion of a winding shaft being disposed in a second chamber of the camera assembly.
FIG. 7B is a partial cross-sectional view showing the winding shaft of the fixture passing through the endcap assembly.
FIG. 7C is a rear view of the endcap assembly, taken along view 7C-7C in FIG. 5A, showing the shutter blade moved toward the second position.

Returning to the camera assembly 2, as shown in FIG. 5, an exposure window (not shown) can be arranged between the first and second film chambers 12,14 and located between an upper guide 40 and a lower film guide 42, which support the film at its edges as it extends between the film chambers 12,14. A film passageway for the film to travel between the film chambers 12,14 can be defined between the back cover 8 and opposed regions of the main body 4 and film guides 40,42.

The back cover 8 can be associated with the rest of the camera assembly 2 in any of a number of ways, as will be appreciated by one skilled in the art. For example, in one embodiment, the back cover 8 can be removably fitted to the main body 4. In one embodiment, the removable connection can be achieved by providing at opposite edges a pair of protrusions (not shown) on the main body 4 which snap-fit into apertures (not shown) provided on the back cover 8. The back cover 8 can also be provided with releasable locking means or a latch including a pair of finger slides (not shown) having an inwardly directed movable pin (not shown) on the rear cover 8. The finger slides can be movable between an open position, where the rear cover 8 can be simply push-fitted on to the rear of the main body 4 with the pin extending into a recess formed on the main body 4, and a locking position where the pin engages beneath a lug molded on the main body 4. These arrangements allow the user to readily open and close the camera for re-loading films therein. In one embodiment, the rear cover can be retainably attached to the front cover 6 and/or main body 4. For example, one end of the rear cover 8 can be attached to one end of the front cover by one or more hinges 9 (see also FIG. 12). The opposite unhinged ends of the front and rear covers 6,8 can be secured together in any of the manners discussed above. There are still many other ways of removably securing the rear cover 8 to the front cover 6 and/or main body 4, as will be appreciated by one skilled in the art. While embodiments of the invention are not limited to any particular manner of associating the back cover 8 with the rest of the camera assembly 2, the back cover 8 can operatively engage the main body 4 to enclose the chambers 12,14 light-tightly therein.

As is conventional, the camera assembly 2 can be provided with a film advance system for winding the film back into the primary cassette 48 or the conventional film cartridge. The system can include a film advance wheel or thumb wheel 30 rotatably attached to the main body 4. The film advance system can also include a drive shaft 32 operatively connected to the thumb wheel 30. The drive shaft 32 can extend into the first chamber 12. When a film cartridge 48 is disposed in the first chamber 12 (see FIG. 8), the drive shaft 32 can engage the central spool of the cartridge 48. The film advance system can further include a film sprocket wheel 34 located just above the film exposure window, and a film counter (not shown). The film sprocket wheel 34 can be operatively connected to the re-cocking system of the shutter (not shown), so that each time the film is wound one frame by the user (by turning the film advance wheel), the film sprocket wheel 34 is rotated one turn, which brings a lever of the shutter back to its primed position, and in addition prevents further rotation of the film advance wheel 30. The film advance and shutter re-cocking systems are well known in the art, and embodiments of the invention are not limited to any particular configuration for either system.

Figure 1C:
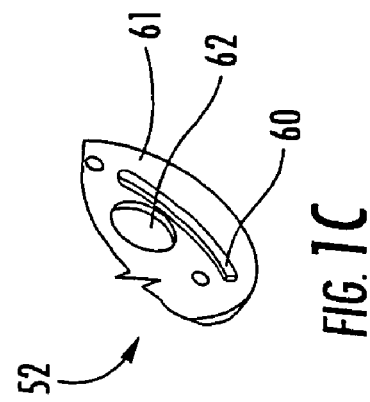
FIG. 1C is a partial isometric view of an endcap assembly according to embodiments of the invention, taken along line 1C-1C in FIG. 1B.
Figure 1B:
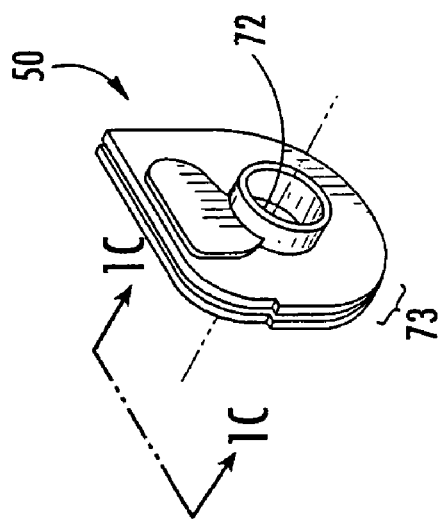
FIG. 1B is an isometric view of an endcap assembly according to embodiments of the invention.
Figure 1A:
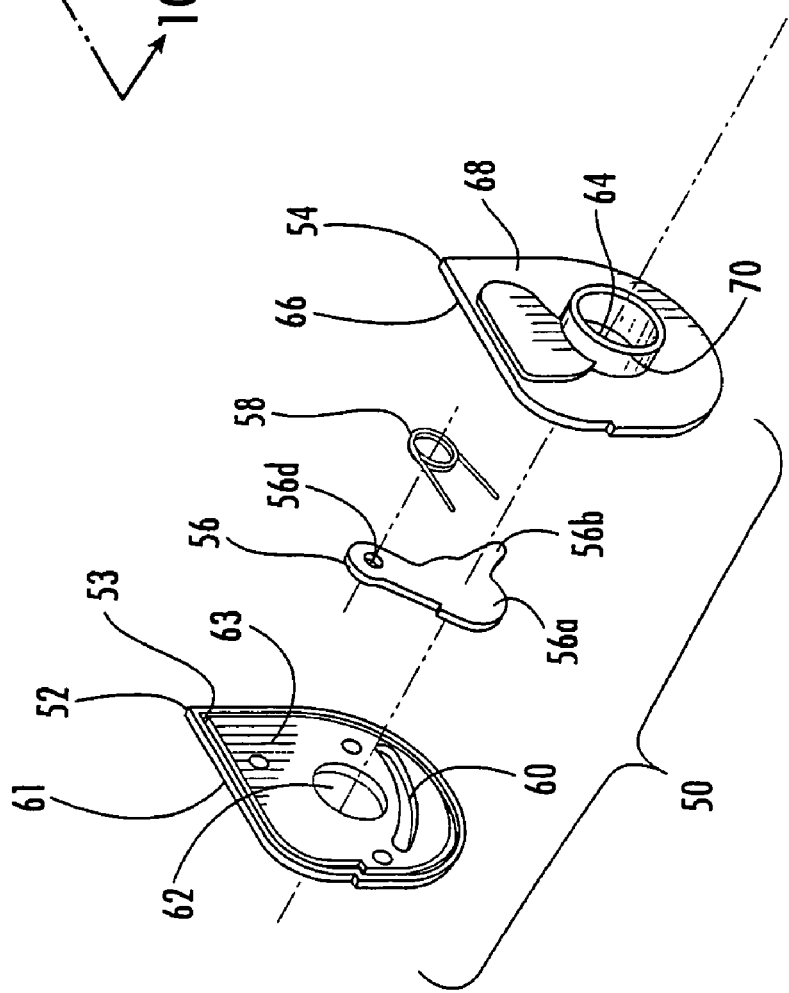
FIG. 1A is an exploded isometric view of an endcap assembly according to embodiments of the invention.

Turning to FIGS. 1A-1C, embodiments of the invention relate to an endcap assembly 50 for closing one end, such as the lower end, of the second chamber 14. As will be described later, the endcap assembly 50 can facilitate the loading of film into the camera 2, both during initial film loading by a manufacturer and later film reloading by a consumer or manufacturer. One example of an endcap assembly 50 is shown in FIGS. 1A-1C. The endcap assembly 50 can include several components such as a first plate 52, a second plate 54, a shutter 56 and a biasing element 58. Each of these components will be discussed in turn below.

The first plate 52 can have numerous configurations. Regardless of its overall shape, the first plate 52 can have a slot or groove 60, which can extend completely through the thickness of the first plate 52. The slot 60 can be generally arcuate, as shown in FIG. 1A, but other conformations are possible. The first plate 52 can further include an opening 62 that extends through the first plate 52. The opening 62 can be centrally located on the first plate 52. As shown, the opening 62 can be substantially circular, but other shapes are possible such as polygonal and rectangular, to name a few. The first plate 52 can have an inward facing side 61 and an outward facing side 63. The first plate 52 can be made of a variety of materials and by a variety of processes; preferably, the first plate 52 is a molded plastic part. As will be described later, the first plate 52 can be a stand alone piece or it can be integral or unitary with the camera assembly 2.

Like the first plate 52, the second plate 54 can have many configurations. However, it is preferred if the first and second plates 52,54 are correspondingly similar. The second plate 54 can include an opening 64 that extends through the second plate 54. The opening 64 can be centrally located on the second plate 54. The opening 64 can have various shapes, including substantially circular as shown. It is preferred if the openings 62,64 in the first and second plates 52,54 are substantially identical, which is meant to include exactly identical as well as slight variances therefrom. The openings 62,64 can, however, be different.

The second plate 64 includes an inner face 66 and an outer face 68. Substantially peripherally surrounding the opening 64 in the second plate 54 can be a shoulder or collar 70. The shoulder or collar 70 can extend substantially perpendicularly away from the outer face 68 of the second plate 54. In one embodiment, the collar 70 can be substantially cylindrical while the opening 64 is substantially circular. In some cases, the second plate 64 may not provide a collar. The second plate 54 can be a single plastic molded component or it can be an assembly of several sub-components joined together by, for example, welding.

The first plate 52 and the second plate 54 can be secured together in several ways. For instance, the first plate 52 can have a peripheral groove 53 in its outward face 63 that can engage a peripheral upstanding rib (not shown) on the inside face 66 of the second plate 54. Such an interlocking engagement is preferable because the overlapping groove and rib can provide additional protection from the infiltration of light into the camera assembly 2. Other manners for securing the first and second plates 52,54 are possible including welding, adhesives, fasteners, and interference fit, to name a few.

When the first and second plates 52,54 are secured together, the opening 62 in the first plate 52 can be substantially aligned with the opening 64 in the second plate 54. Accordingly, an elongated member can be simultaneously received in the aligned openings 62,64. In one embodiment, the openings 62,64 can be substantially coaxial, even when the openings 62,64 are not substantially identical. However, the openings 62,64 do not have to be substantially coaxial. For instance, the openings 62,64 can be offset from each other, yet sufficiently aligned such that a rod or other elongated member can simultaneously pass through each opening 62,64. In any case, the aligned openings 62,64 define an aperture 72 in the endcap assembly 50.

Another component of the endcap assembly 50 is a shutter blade 56, as shown in FIG. 1A, which can be disposed between the first and second plates 52,54. The shutter blade 56 can include a mask portion 56a and an actuator arm portion 56b. A projection 56c (see FIG. 7C) can protrude substantially perpendicularly or otherwise from the actuation arm portion 56b. The projection 56c can be any of a number of shapes and can extend at least partially into the groove 60 in the first plate 52. In one embodiment, the projection 56c can extend through and beyond the groove 60. In any case, the projection 56c is positioned such that a user can access the projection 56c by hand, fingernail or with the assistance of a tool such as a screwdriver. The user can access the projection 56c from the inward face 61 of the first plate 52, by way of groove 60.

The shutter blade 56 can be pivotable about a pivot point. Pivot point can be an opening 56d on the shutter blade 56, which can fit over a post (not shown) provided on either the first or second plate 52,54. The shutter blade 56 can be made of various materials and by several processes, but molded plastic is preferred.

The shutter blade 56 can be movable between a first position and a second position. In the first position, the shutter blade 56 can substantially light-tightly cover the aperture 72 in the endcap assembly 50. For instance, the mask portion 56a of the shutter blade 56 can substantially light-tightly cover the aperture 72. In the second position, the aperture 72 can be substantially unobstructed by the shutter blade 56.

Preferably, the shutter blade 56 is biased into the first position. Accordingly, a biasing element can be included as part of the endcap assembly 50. The biasing element can be a spring 58, as shown in FIG. 1A. The spring 58 can be of sufficient force to bias the shutter blade 56 into the first position; however, it is preferred if a user can manually overcome the force of the spring 58 by hand, fingernail or tool manipulated by the user. The spring 58 shown in FIG. 1A is only one example of a biasing element according to embodiments of the invention; other springs and other biasing elements can be used as would be appreciated by one skilled in the art.

Again, the above-described endcap assembly 50 is only an example of one possible endcap assembly. Other configurations are possible. For instance, an endcap assembly according to aspects of the invention is not limited to having two or more plates sandwiched together. In one embodiment, the endcap assembly may only include a single plate having an aperture, such as the second plate 54. The shutter blade 56 can be movably mounted on one side of such a single-plate endcap. The single plate can have any of the features discussed above including, for example, a collar such as the collar 70. Further, the single plate can be removably mounted to the front cover 6, the back cover 8 and/or the main body 4. Alternatively, at least a portion of the single plate can be formed with the front cover 6, the back cover 8 and/or the main body 4.

The endcap assembly 50 can be associated with the camera assembly 2 in a number of ways. In one embodiment, shown in FIG. 2A, the endcap assembly 50 can be a separate assembly 50 altogether that can be removably installed into the camera assembly 2. In such case, the main body 4 and/or front cover 6 can be configured to removably lockingly engage the endcap assembly 50 so as to substantially close off the bottom portion of the second chamber 14. For instance, the main body 4 and/or front cover 6 can form a cradle 7, shaped to receive and engage at least a portion of the endcap assembly 50. Thus, a user can install the endcap assembly 50 by inserting the endcap assembly 50 into the cradle 7 in a substantially downward, straight motion, as shown in FIG. 2A, until the endcap 50 lockingly engages the camera assembly 2 to form the camera assembly with endcap 2a, as shown in FIG. 2B. Of course, the camera assembly 2 can be designed to allow other directions of insertion of the endcap assembly 50. Embodiments of the invention are not limited to a particular order or manner of assembling the endcap assembly 50.

In other embodiments, one or more components of the endcap assembly 50 can be formed with various portions of the camera assembly 2. The phrase "formed with" is meant to include such components being unitary, such as molded together, and other types of more permanent construction, such as by welding or adhesives. In one instance, the endcap first plate 52 can be formed with the main body 4, as shown in FIG. 3A. The integral arrangement can be accomplished in a variety of ways. For example, the first plate 52 can be molded as one piece with the main body 4. Alternatively, the first plate 52 can be secured to the body by welding, brazing, adhesives, or interference fit. The remaining components of the endcap assembly 50 (i.e., the second plate 54, the shutter blade 56 and spring 58) can be assembled with the first plate 52 to form a camera assembly with endcap 2a, as shown in FIG. 3B. One manner of assembling the partially integral endcap assembly 50 includes positioning the spring 58 and the opening 56d in the shutter blade 56 over a post or protrusion (not shown) on the second plate 54. Next, the second plate 54 with attached components are inserted into the camera assembly 2, such as in a substantially downward motion, as shown in FIG. 3A. As a result, the first and second plates 52,54 will sandwich the shutter blade 56 and spring 58. Again, the first and second plates 52,54 can be joined in any of the manners discussed earlier.

With respect to a partially integral endcap design shown in FIGS. 3A and 3B, portions of the endcap assembly 50 can be integral with other portions of the camera assembly 2. For instance, at least a portion of the second plate 54 can be integral with the camera assembly 2. Not only can one or more sub-components of the endcap 50 be integral with the main body 4, but such components can also be integral with the back cover 8 and/or front cover 6 as well. In one embodiment, shown in FIG. 4A, the first plate 52 of the endcap assembly 50 can comprise at least two pieces. For purposes of convenience and facilitating discussion, the endcap configuration shown in FIGS. 4A and 4B will be referred to herein as the split endcap assembly. A first piece 300 can be integral with the back cover 8 and a second piece 302 can be integral with the main body 4. In such case, the other components of the endcap assembly 50 can be installed as described above to form a camera assembly 2a, such as the one shown in FIG. 4B. However, the split endcap assembly is not fully complete until the back cover 8 is closed such that the first piece 300 and second piece 302 engage each other so as to form the first plate of the endcap assembly.

Figure 4A:
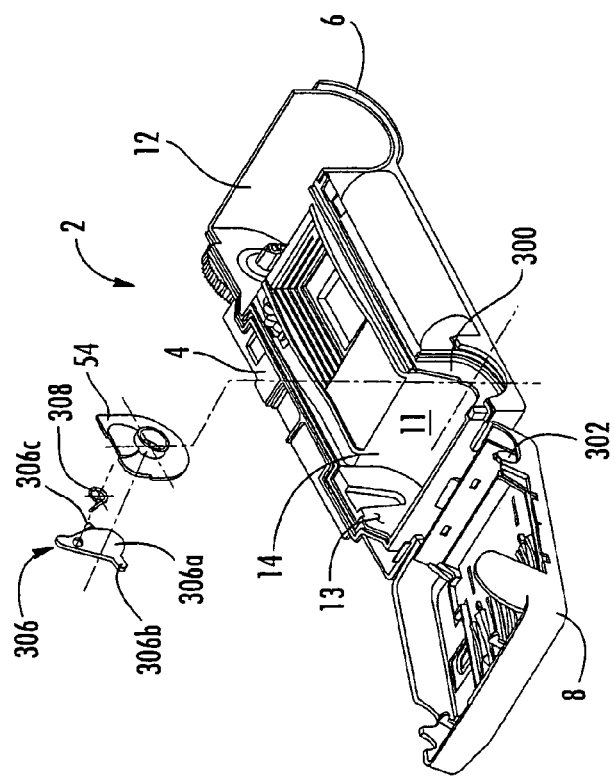
FIG. 4A is an isometric view of a camera assembly according to embodiments of the invention in which one portion of the endcap assembly is integral with the main body of the camera assembly and another portion of the endcap assembly is integral with the back cover of the camera assembly.

Aspects of the invention are not limited to a particular shutter blade design. While one design was described earlier, another shutter blade can be used in connection with the split endcap assembly. As shown in FIG. 4A, the shutter blade 306 can include a mask portion 306a for covering the aperture in the assembly and an actuator arm portion 306b. A projection 306c can protrude substantially perpendicularly or otherwise for engaging a spring 308. Because the first plate of the split endcap assembly is not formed until the first and second pieces 300,302 are brought together with the closing of the back cover 8, the split endcap assembly does not need to provide a groove or a slot for allowing user access to the shutter blade 306. The shutter blade 306 can be pivotable about a pivot point. The pivot point can be an opening 306d on the shutter blade 306, which can fit over a post or protrusion (not shown) provided on either the first or second plate 52,54.

In any of the foregoing embodiments of the camera and endcap configurations, the main body 4 and/or front cover 6 can be configured to lockingly engage, removably or otherwise, the remaining components of the endcap assembly 50. Alternatively, at least a portion of the peripheral edge 73 of the endcap assembly 50 as well as the adjacent parts of the main body 4, front cover 6, and/or back cover 8 can be provided with appropriate adaptations, such as in the form of co-operating grooves on the peripheral edge 73 and flanges on the main body 4, which together ensure light-tight closure of the opening at the bottom of the second chamber 14.

Figure 12:
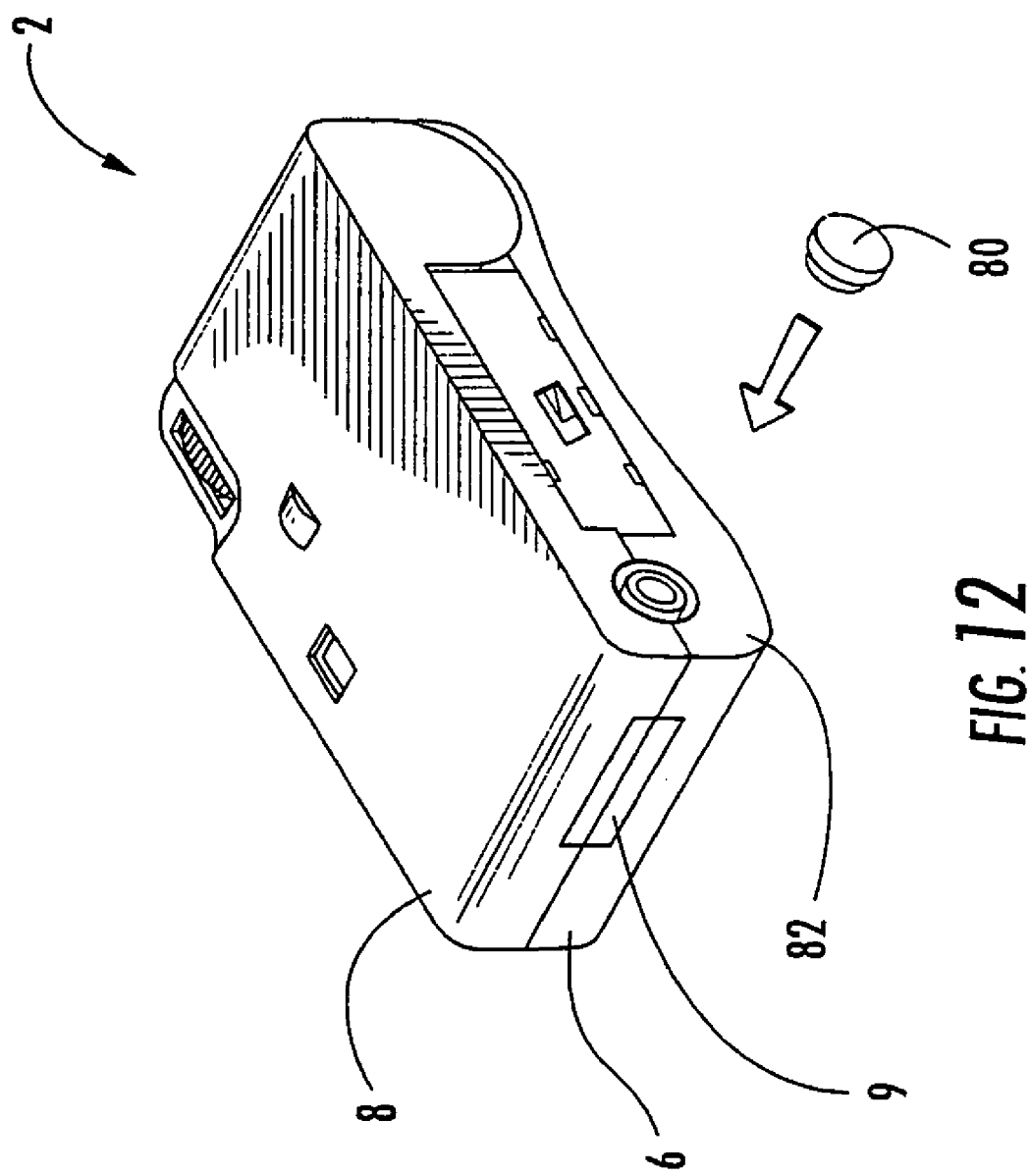
FIG. 12 is an isometric view of one step of a loading process according to embodiments of the invention, showing a plug being inserted into engagement with the camera assembly.

For additional light-tightness protection, a plug 80 can be placed over, into, and/or around the collar 70 of the endcap assembly 50, as shown in FIG. 12. Ideally, the plug 80 can be removed when necessary. The plug 80 can be made of plastic or almost any other material. When installed, it is preferable if the plug is substantially flush with the bottom surface 82 of the camera 2 formed by at least the front and back covers 6,8.

Having described the individual components and manner in which the components can be arranged to form a camera assembly in accordance with aspects of the present invention, one illustrative manner in which film can be loaded into such a camera assembly 2 will now be described. The following description is merely an example of a sequence in which the individual steps can occur, and it is not intended to limit the scope of the invention to the exact method described, for not every step need occur. Further, the various steps do not necessarily need to be performed in the order set forth below.

Figure 4B:
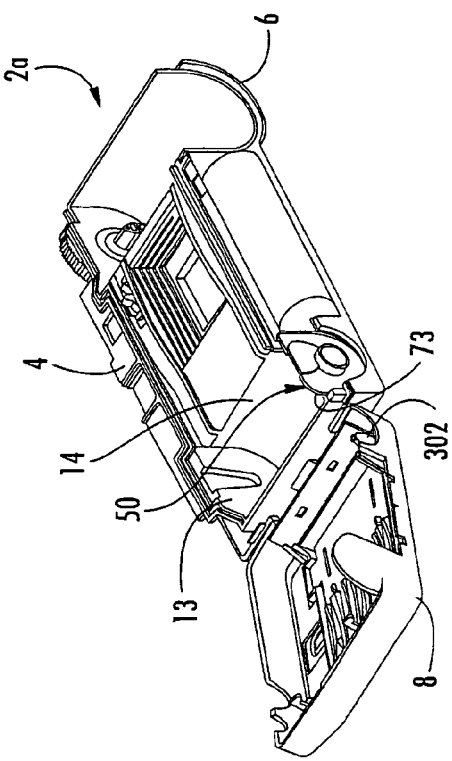
FIG. 4B is an isometric view of a camera assembly according to embodiments of the invention, showing the endcap assembly installed in the camera assembly.

At the outset, a camera assembly 2 is provided. The camera assembly 2 can be any of the embodiments discussed above including camera assemblies having a completely removable endcap assembly (FIGS. 2A-B), an at least partially integral or unitary endcap assembly (FIG. 3A-B), or a split endcap assembly (FIGS. 4A-B). The back cover 8 of the camera 2 can be removed or retainably detached, such as shown in FIG. 5.

Referring to FIG. 5, a fixture 100 can be provided for facilitating the loading of film into the camera assembly 2. The fixture 100 can provide a surface 102 on which the camera can rest; the surface 102 can be recessed so as to conformingly receive at least the front cover portion 6 of the camera assembly 2. Alternatively, the fixture 100 may not include the camera receiving surface 102. Instead, a jig or a stand 104 (FIG. 6A) can be provided substantially adjacent to the fixture 100, and the jig or stand 104 can include a recessed region for receiving at least a portion of the camera assembly 2, such as the front cover 6. In yet another alternative, the fixture 100 can be placed substantially adjacent to the camera 2, and both the camera 2 and fixture 100 can rest atop a substantially flat surface such as a table (not shown).

The fixture 100 can include a generally planar and/or substantially flat base 106 on which a sleeve 108 and a film winding rod 10 can be mounted. In one embodiment, the sleeve 108 and rod 110 can be slidably mounted on the base. Accordingly, one or more sliders can be provided for slidably engaging the base 106. One skilled in the art would readily appreciate the variety of ways in which the sleeve 108 and rod 110 can be slidably mounted on the base 106. In one embodiment, shown in FIG. 5, separate sliders can be provided for the rod 110 and the sleeve 108. The film winding rod 110 and the sleeve 108 can be attached to or carried on the sliders 112a,112b, respectively, in any of a variety of ways including by fasteners, welding, and adhesives, to name a few possibilities. Further, the film winding rod 110 and the sleeve 108 can be directly or indirectly connected to the sliders 112a,112b. One example of an indirect mode of attachment is shown in FIG. 6A, in which a film winding apparatus 136 is disposed between the film winding rod 110 and the slider 112a The top surface of the sliders 112a,112b can be substantially flush with the top surface of the base 106.

As shown in FIG. 5, the sleeve 108 can be an elongated hollow part, having a proximal end 114 and a distal end 116 with a longitudinal axis 118 (FIG. 11) extending therebetween. Use of the relative terms "proximal" and "distal" herein is merely to facilitate discussion and is not intended to limit the scope of the invention. As shown in FIG. 6B, the sleeve 108 can have an inner peripheral surface 120 and an outer peripheral surface 122. In one embodiment, shown in FIG. 7B, a portion of the inner peripheral surface 120 at and/or near the distal end 116 of the sleeve 108 can be shaped to matingly engage the collar 70 on the endcap assembly 50. For example, the inner peripheral surface 120 can be shaped to substantially matingly receive the collar 70.

In addition, the sleeve 108 can be generally cylindrical, but embodiments of the invention are not limited to any particular conformation. For instance, the sleeve 108 can also be polygonal or rectangular. Preferably, the sleeve 108 is substantially straight, but embodiments of the invention can include sleeves 108 having one or more bends, tapers, angles or curves on its inner and/or outer peripheral surfaces 120, 122. The sleeve 108 can be made of almost any material including metals and plastics. As will be more fully appreciated later, the sleeve 108 can include various features to maintain light-tightness. For instance, at least a portion of the inner peripheral surface 120 of the sleeve 108 can be coated with light-absorbing materials.

The film winding rod 110 can be generally elongated. Further, at least a portion of the rod 110 can be hollow; alternatively, the rod 110 can be substantially solid. The rod 110 can have a proximal end 124 and a distal end 126 with a longitudinal axis 128 extending therebetween. The rod 110 can have an outer peripheral surface 130.

The rod 110 can be almost any shape, but, preferably, it is substantially similar in conformation to the sleeve 108. In one embodiment, the rod 110 can be substantially cylindrical. It is preferred if the rod 110 is substantially cylindrical at least at and near its distal tip 126, which is the portion of the rod 110 that engages the film and around which the film is wound. A cylindrical or other substantially smooth or edgeless outer peripheral surface 130 can minimize bending, creasing or other distortion of the film. The cross-sectional geometry of the rod 110 can vary along its length. Preferably, the rod 110 is substantially straight, but embodiments of the invention can include a rod 110 having one or more bends, tapers, angles or curves. The film winding rod 110 can be made of almost any material including metals and plastics.

The rod 110 can include one or more features to facilitate engagement with the film. For instance, as shown in FIG. 6B, the distal end 126 of the rod 110 can be adapted to engage a film leader, such as by providing a split 132. The split 132 can begin at the distal end 126 of the rod 110 and extend along a portion of the length of the rod 110 toward the proximal end 124. However, in order to avoid possible intrusion of light, the split 132 should be no longer than the axial length of the sleeve 108. Thus, when the distal end 126 of the winding rod 110 in the second chamber 14, no portion of the split 132 can extend beyond the proximal end 114 of the sleeve 108. If the split were to extend beyond the proximal end 114 of the sleeve 108 during film loading, light may be able to enter the sleeve 108 and ultimately exposure the film.

At least a portion of the rod 110, such as the distal end 126, can be disposed within the sleeve 108. Thus, the rod 110 can be sized to fit within the sleeve 108. Further, the rod 110 can be movable within the sleeve 108. For instance, the rod 110 can move substantially axially within the sleeve 108; that is, the rod 110 can move in the general direction of the longitudinal axis of the sleeve 108. Moreover, the rod 110 can rotate about its longitudinal axis 128 inside of the sleeve 108.

In one embodiment, the rod 110 can be substantially coaxial with the sleeve 108. Further, the rod 110 and the sleeve 108 can be positioned relative to each other on the fixture 100 or sliders 112a,112b such that, at any given position, at least a portion of the rod 110 is disposed within the sleeve 108. The interface between the rod 110 and the sleeve 108, at least at the proximal end 114 of the sleeve 108, can include various features to maintain light-tightness. For instance, the inner peripheral surface 120 at the proximal end 114 of the sleeve 108 can provide velvet, felt or similar material so as to substantially reduce or eliminate any light passageways or gaps between the sleeve 108 and the rod 110.

The proximal end 124 of the rod 110 can be attached to a winding device 136 for automatically turning the rod 110. In one embodiment, the winding device 136 can include an electric motor 138 supported on the base 106 by a slide 112. In such case, the winding rod 110 is indirectly mounted to the slider 112. The winding device 136 can be any device that reduces or eliminates the need for manual turning of the rod 110. In one embodiment, the rod 110 may not be connected to an automated winding device; accordingly, a user can turn the winding rod 110 by hand.

It should be noted that embodiments of the invention are not limited to the winding rod 110 and sleeve 108 being associated with a fixture 100 as described above. For instance, the rod 110 and the sleeve 108 can simply be separate pieces that can be entirely manipulated by hand. However, the use of a fixture 100 is well suited for a production environment.

When ready, the distal end 116 of the sleeve 108 can be moved into substantially overlapping relation with the collar 70 on the endcap assembly 50. For example, as shown in FIGS. 6A-B, the sleeve 108 can be placed over the collar 70. As noted before, the inner peripheral wall 120 of the sleeve 108 can be configured to substantially matingly engage the collar 70 so as to ensure proper alignment and contribute to light-tightness. Alternatively, the overlapping relation can be achieved by placing the distal end 116 of the sleeve 108 inside of the collar 70. Accordingly, the collar 70 can be configured to substantially matingly receive the sleeve 108. In either case, it is preferable if the overlap between the sleeve 108 and collar 70 is substantially light-tight. As noted earlier, there may be some embodiments in which a collar 70 is not provided. In such case, the distal end 116 of the sleeve 108 can be brought into light-tight engagement, by abutment or otherwise, with the endcap assembly 50 so as to light-tightly surround the aperture 72 in the endcap assembly 50.

Because the rear cover 8 of the camera assembly 2 is opened or removed, a person loading film in the camera 2 can access the first plate 52 of the endcap assembly 50. More specifically, a person can access the projection 56c of the shutter blade 56 that extends from the actuation arm portion 56b and into or beyond the groove 60 in the first plate 52. In the case of the split endcap construction, shown in FIGS. 4A-B, a user can directly access the shutter blade 306. Using a finger, fingernail, or tool, a user can move the shutter blade 56 (or shutter blade 306) into the second position by defeating the force of the spring 58 (or the spring 308), as shown in FIG. 7C. Once the shutter blade 56 is in the second position, the aperture 72 through the endcap assembly 50 can be substantially unobstructed.

The winding rod 110 can be moved axially within the sleeve 108 and toward the camera assembly 2. Ultimately, the user can push the rod 110 through the endcap assembly 50 by way of the aperture 72 and into the second chamber 14 of the camera assembly 2, as shown in FIGS. 7A-B. As a result, at least a portion the distal end 126 of the winding rod 110 can be disposed within the second chamber 14. At this point, the user can release the projection 56c of the shutter blade 56 as the shutter 56 will not be able to move back into the first position because the rod 110 will be in its way, as shown in FIG. 7B. The upper endcap or wall 13 of the second chamber 14 can provide one or more features for cooperating with the distal end 126 of the rod 110. For instance, as shown in FIG. 6A, the upper wall 13 can include a cradle-like recess 13a for receiving and supporting the distal end 126 of the rod 110 during the film loading process.

Figure 8:
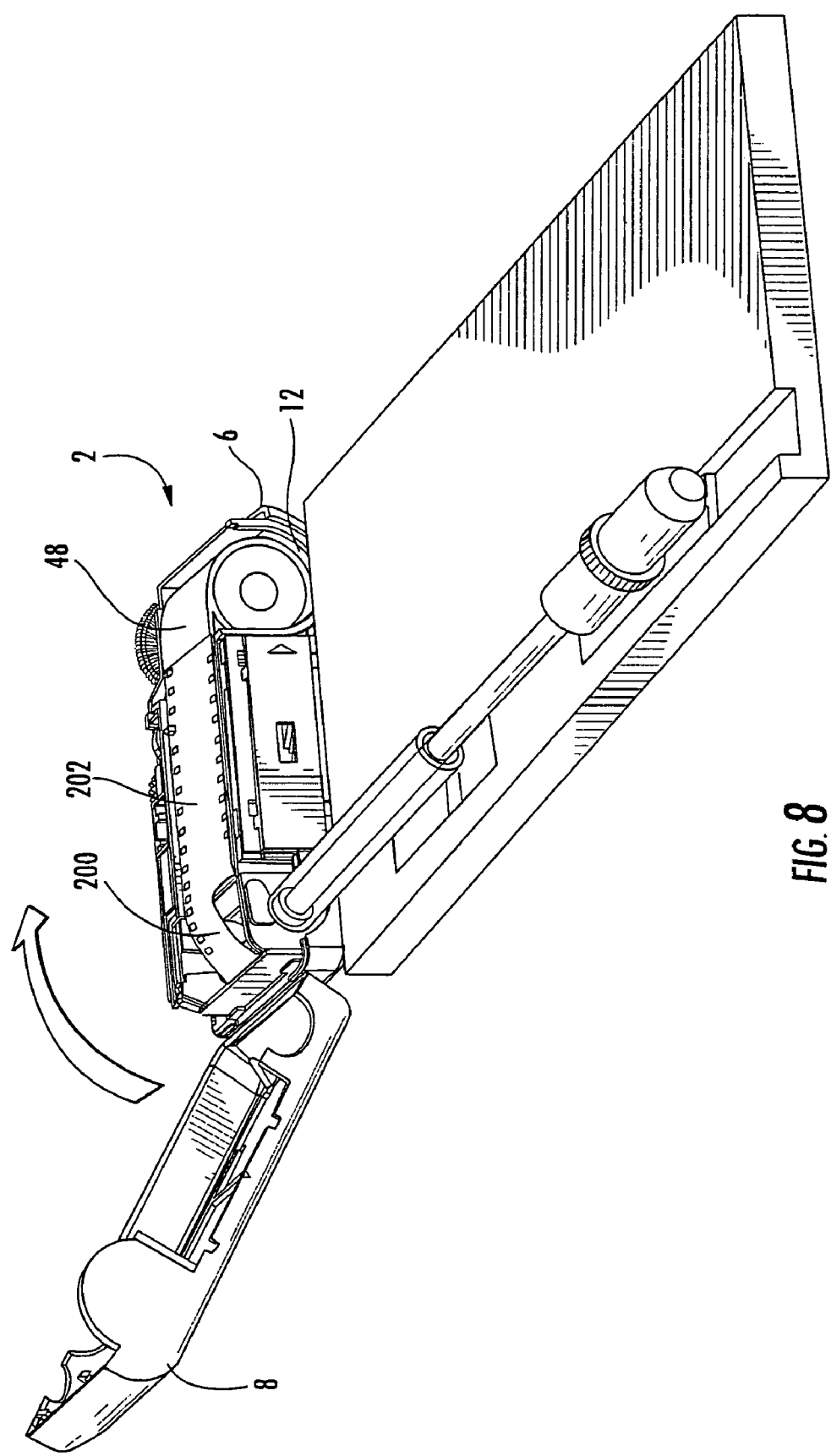
FIG. 8 is an isometric view of a film cassette positioned in the camera assembly with a leader portion of film withdrawn therefrom.
Figure 9:
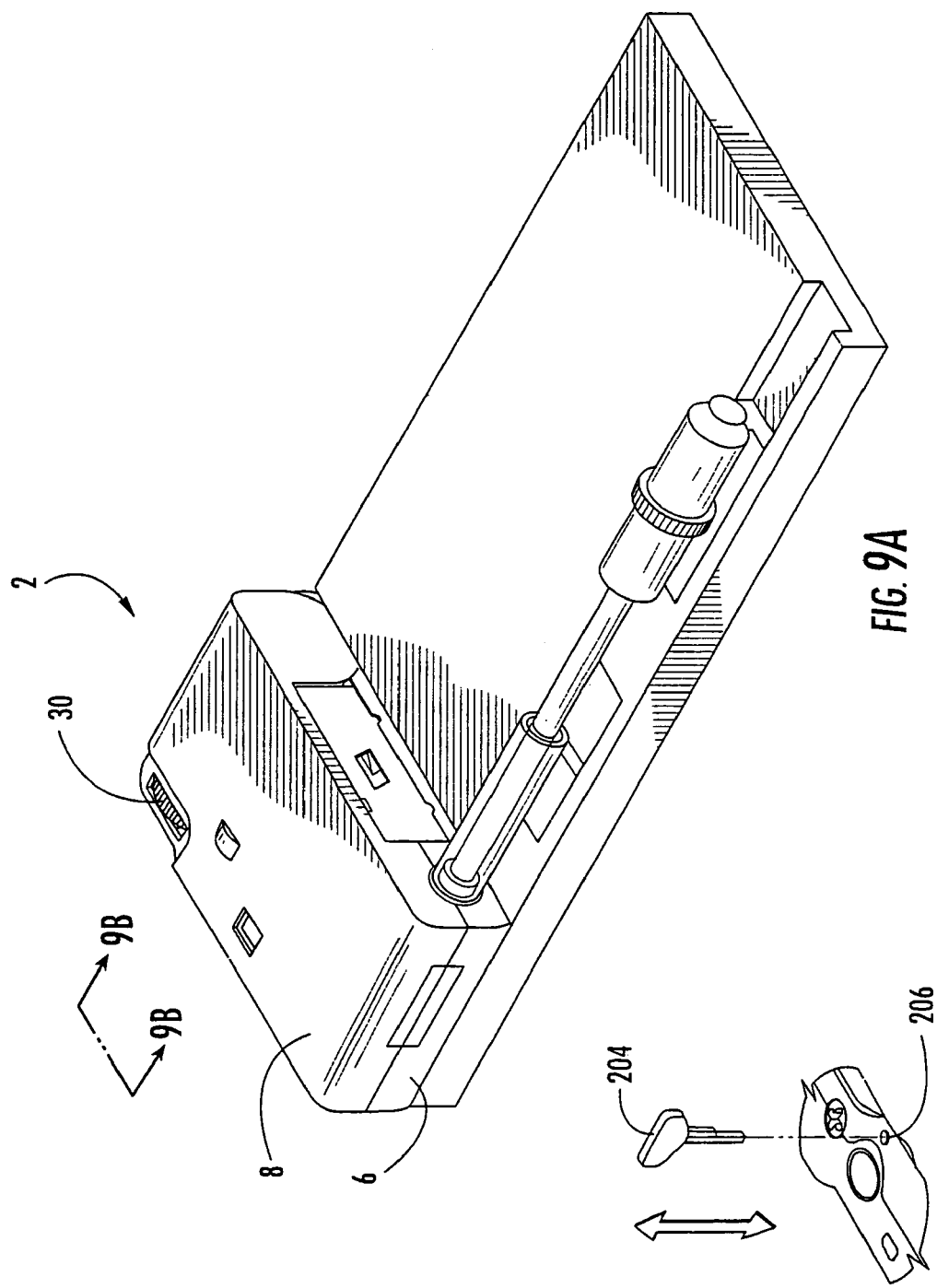
FIG. 9A is an isometric view of one step of a loading process according to embodiments of the invention, showing the back cover in a closed position.
FIG. 9B is an isometric view of one step of a loading process according to embodiments of the invention, taken along line 9B-9B in FIG. 9A, showing a key being inserted in the camera assembly to deactivate a film advance wheel sprocket.

Next, as shown in FIG. 8, a film cassette 48, such as a conventional 35 millimeter cassette, can be placed in the first chamber 12 of the camera assembly 2. The cassette 48 can be positioned such that the drive shaft 32 engages the central spool (not shown) of the film cassette 48. The leading end portion 200 of the film 202 can be withdrawn from the cassette 48 and secured to the winding rod 110. For example, a portion of the leading end 200 can be inserted into the split 132 in the distal end 126 of the rod 110. The rod 110 can be turned a few times so that one or more convolutions of the film are wrapped around the rod 110. Alternatively, the leading end 200 of the film 202 can be attached to the distal end 126 of the rod 110 by using, for example, tape. Once the leading end 200 of the film 202 is sufficiently secured to the rod 110, the back cover 8 of the camera assembly 2 can be closed, such that the camera assembly 2 is light-tight, as shown in FIG. 9A.

The film advance wheel 30 and system of the camera 2 may only permit substantially one-way movement of the film—moving from the second chamber 14 to the first chamber 12. Therefore, in order to wind the film 202 out of the film cassette 48, the film advance wheel 30 or film advance system can be released or disengaged. One manner of releasing the wheel 30 or film advance system is by inserting a key 204 into a camera key hole 206 so as to disengage the film advance wheel 30 or film advance system.

The film winding rod 110 can now be turned such that the film 202 is wound out of the film cassette 48 and onto the winding rod 110. Again, the winding can be performed manually or it can be done using, for example, a motor. Once the desired length of film 202 is unwound out of the cassette 48 and into the second chamber 14, the key 204 can be removed from the key hole 206 such that the film advance wheel 30 only permits one-way travel of the film 202 from the second chamber 14 back into the cassette 48. Notably, the film winding can occur in daylight or lighted conditions, as can the other steps of a method according to embodiments the invention.

Figure 10:
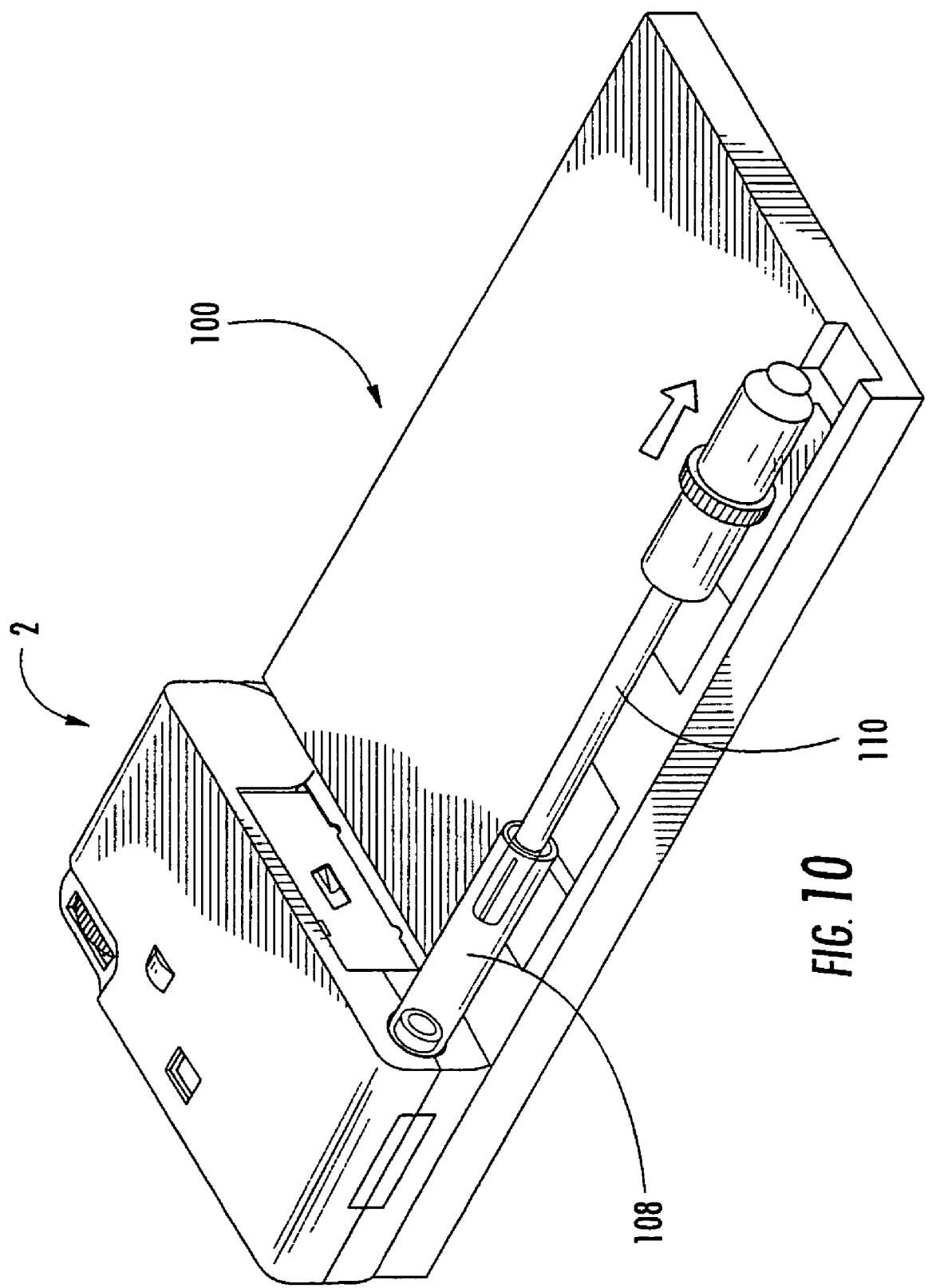
FIG. 10 is an isometric view of one step of a loading process according to embodiments of the invention, showing the winding shaft being withdrawn from the camera assembly.

Next, the rod 110 can be disengaged from the film wound around it in the second chamber 14 of the camera assembly 2. The rod 110 can be withdrawn from the second chamber 14, as shown in FIG. 10. When the rod 110 is configured with the split 132, as described earlier, the wound film will simply slide off the distal end 126 of the rod 110 and through the split 132 at the distal end 126 of the rod 110.

The significance of the sleeve 108 is fully appreciated when the rod 110 is withdrawn from the second chamber 14. If the sleeve 108 were not in place, then in that instant between the removal of the rod 110 from the camera assembly 2 and the closing of the shutter blade 56 in the endcap assembly 50, it is possible that enough light could invade the camera assembly 2 to spoil the unexposed film in the second chamber 14. However, by providing an elongated sleeve 108 in light-tight relation around the collar 70, the only potential light path is between the rod 110 and the sleeve 108 at the proximal end 114 of the sleeve 108. As noted earlier, precautions can be taken to minimize intrusion of light in this area. But, even assuming that light rays actually enter the sleeve 108, the light must travel down the length of the sleeve 108 before reaching aperture 72. By the time the light makes this journey, the shutter blade 56 will have moved into the first position, thereby substantially blocking any light from entering the second film chamber 14.

Figure 11:
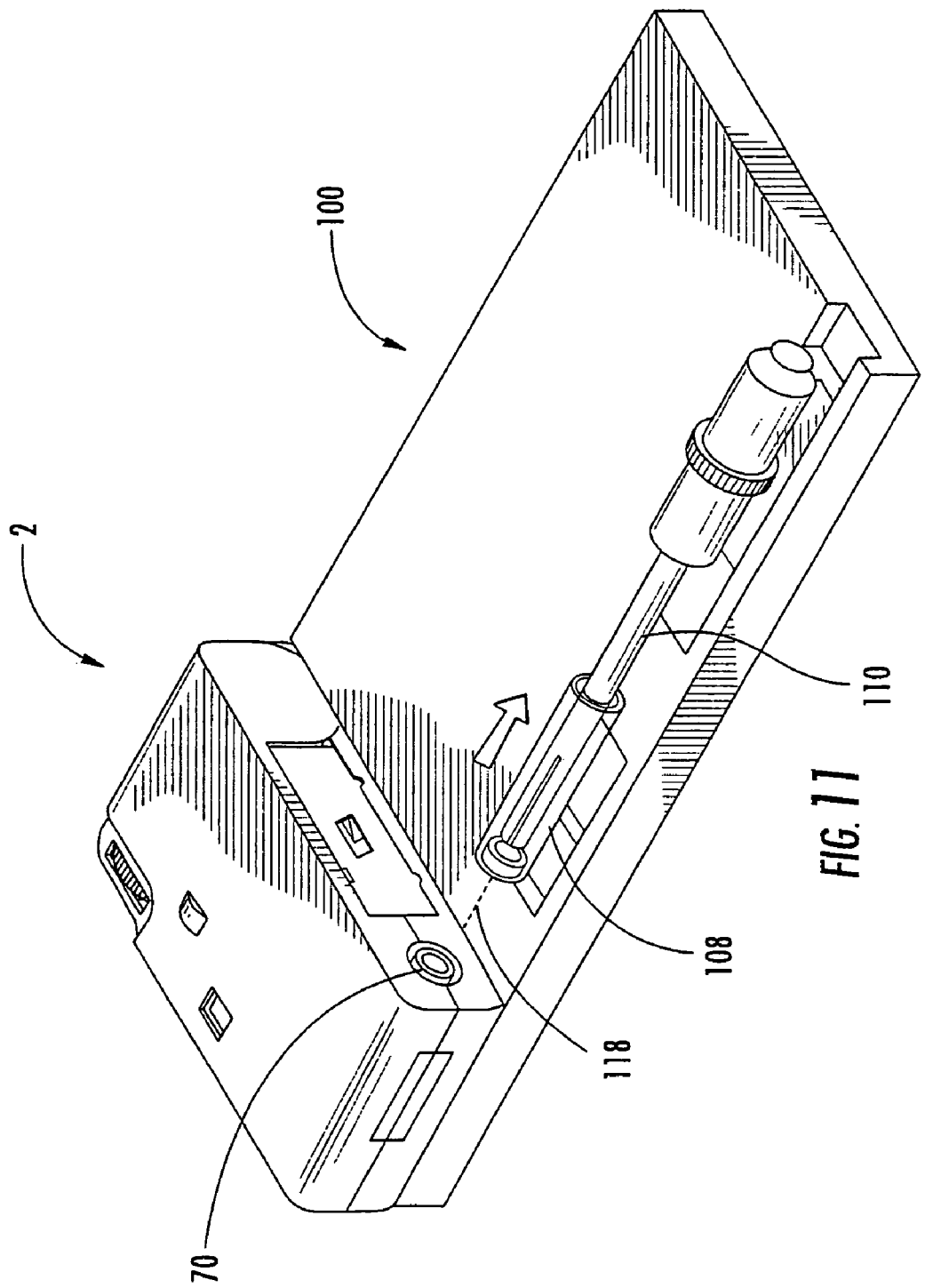
FIG. 11 is an isometric view of one step of a loading process according to embodiments of the invention, showing the sleeve being withdrawn from the camera assembly.

As shown in FIG. 11, the sleeve 108 can now be retracted or otherwise disengaged from the collar 70 on the endcap assembly 50. At this point the camera assembly 2 can be removed from the fixture 100. For added protection from light exposure near the endcap assembly 50, which forms the bottom portion of the second chamber 14, a plug 80 can be brought into engagement with the camera assembly 2, as shown in FIG. 12. The plug 80 can fit inside, around, and/or over the collar 70 of the endcap assembly 50 so as to substantially seal any gaps between the front and rear covers 6,8 in this area. The plug 80 can be held in place in any of a number of ways, as would be appreciated by one skilled in the art, but, ideally, the plug 80 is readily removable. Preferably, when the plug 80 is in place, the plug 80 and the bottom surface 82 of the camera assembly 2 are substantially flush, as is shown in FIG. 13. The plug 80 can further prevent tampering, intrusion by unwanted substances, and can further maintain light-tightness of the second chamber 14 in the event that the shutter blade 56 of the endcap assembly 50 is somehow unintentionally triggered. The plug 80 can be made of any material, and preferably it is plastic.

Figure 14:
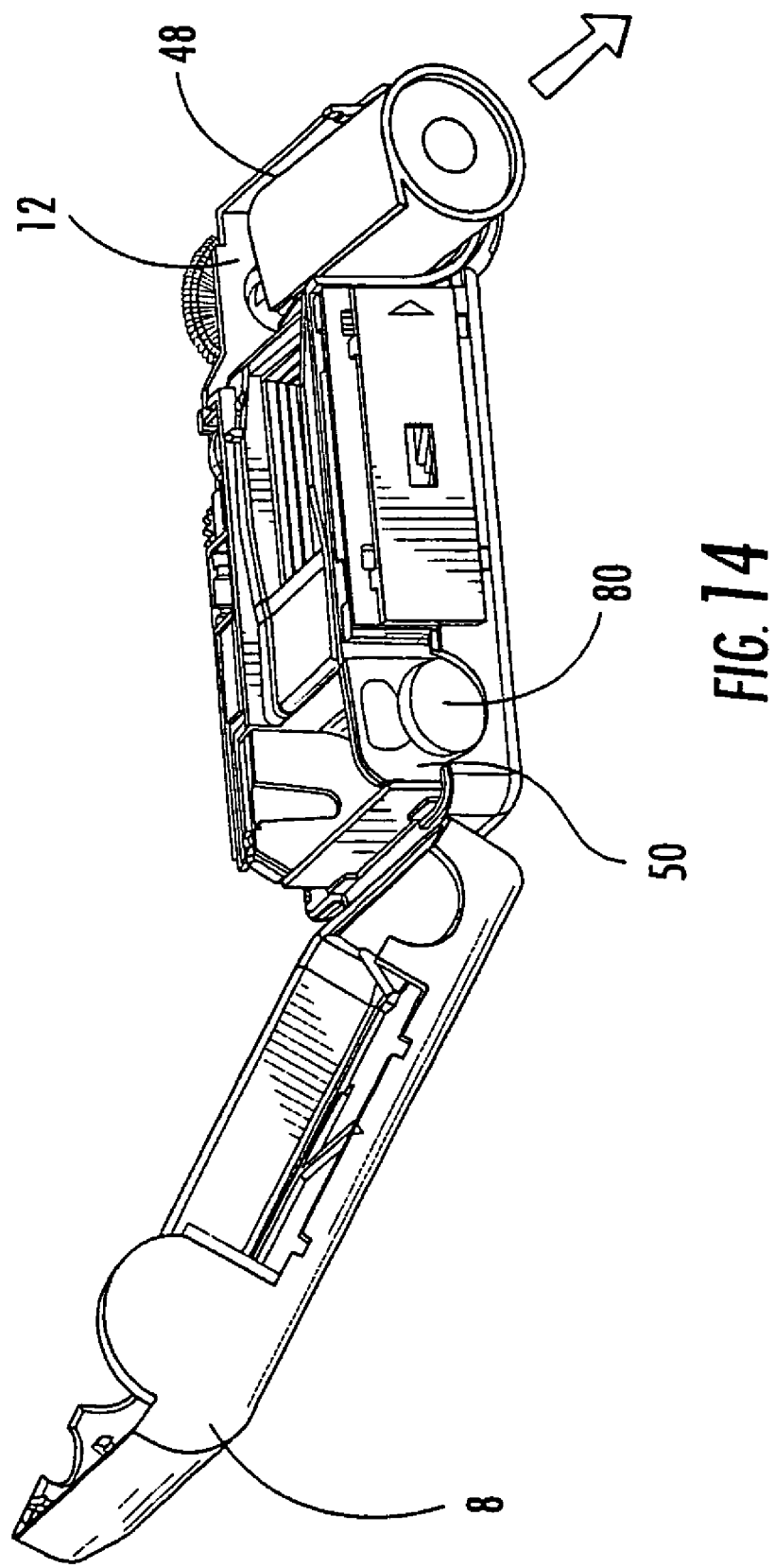
FIG. 14 is an isometric view of a camera assembly according to embodiments of the invention, wherein the back cover is opened such that the film cassette can be removed.

Once the plug 80 is installed, the camera assembly 2 is loaded and is ready for use. A consumer can take photos using the camera 2 until all the shots are exposed. When this occurs, all of the film 202 should be wound back into the film cassette 48. A user can open the camera, such as by removing back cover 8, and extract the cassette 48 from the first chamber 12 and return it to a photo processor for development, as is shown in FIG. 14.

If a user wishes to reuse the camera assembly 2, then the camera assembly 2 is readily reloadable. For example, the second chamber 14 can be sized so as to receive a secondary cassette from a DCS-type film assembly. Thus, as shown in FIG. 15, a user can simply insert the two cassettes of the DCS film into their respective chambers—the primary cassette 22 being placed in the first chamber 12 and the secondary cassette 24 being placed in the second chamber 14. The two cassettes 22,24 of the DCS 20 can be inserted into their respective chambers 12,14 in the camera assembly substantially simultaneously or otherwise. Based on the size and shape of the second chamber 14, as discussed earlier, the secondary cartridge 24 of the DCS film can be slidably received in the second chamber 14.

Figure 16C:
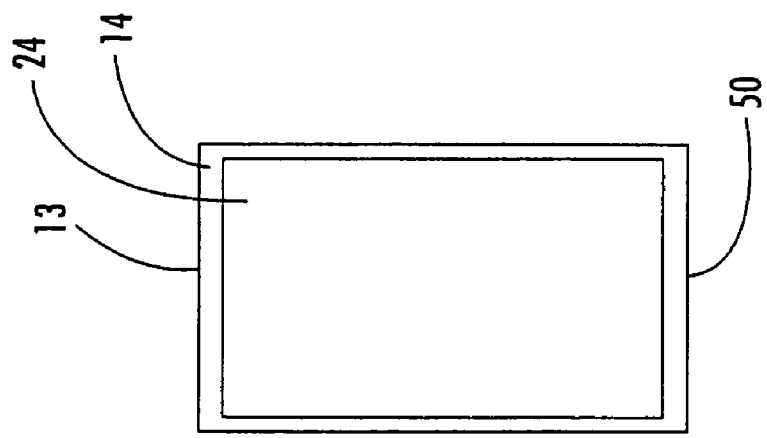
FIG. 16C is a plan view, taken along line 16-16 in FIG. 15, of an embodiment of a second chamber according to embodiments of the invention, wherein the secondary cassette is spaced from the upper and lower walls of the second chamber.
Figure 16B:
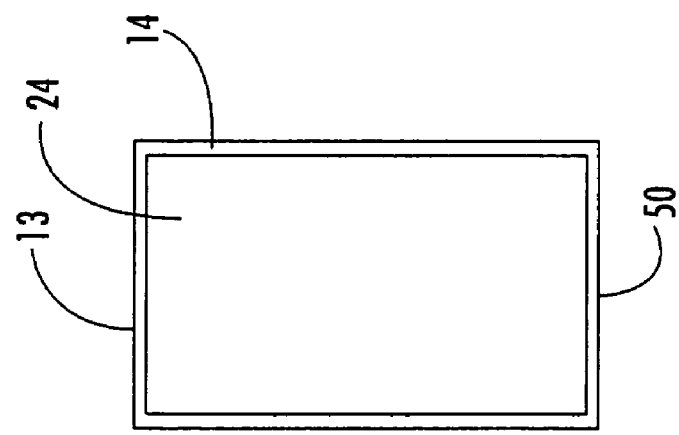
FIG. 16B is a plan view, taken along line 16-16 in FIG. 15, of an embodiment of a second chamber according to embodiments of the invention, wherein the secondary cassette is substantially adjacent to the upper and lower walls of the second chamber.
Figure 16A:
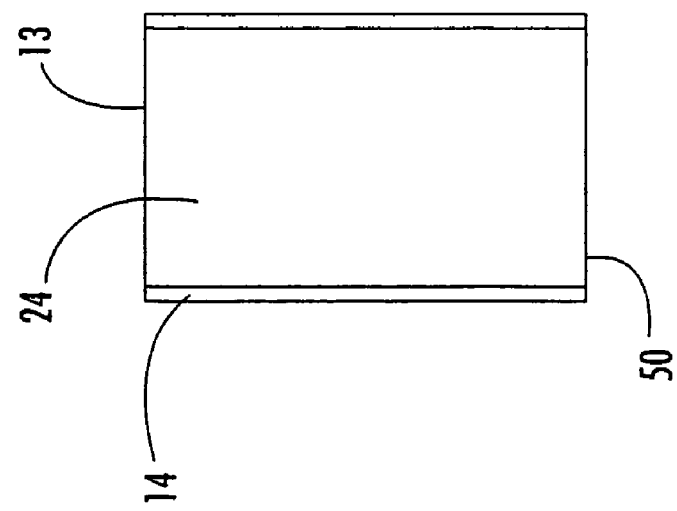
FIG. 16A is a plan view, taken along line 16-16 in FIG. 15, of an embodiment of a second chamber according to embodiments of the invention, wherein the secondary cassette is in contact with the upper and lower walls of the second chamber.

It should be noted that the upper and lower endcaps 13,50 are distinct from the walls of the secondary cassette 24 and these components are not integral. There are a variety of relationships the secondary cassette 24 can have with the upper and lower endcaps or walls 13,50 of the second chamber 14. For instance, the secondary cassette 24 can contact at least one of the upper and lower walls 13,50 of the film chamber 14. FIG. 16A illustrates an instance in which the secondary cassette 24 contacts both the upper and lower endcaps 13,50 of the film chamber 14. Contact can include a single point of contact as well as substantially continuous contact across the entire face of the secondary cassette 24. Alternatively, the secondary cassette 24 can be substantially adjacent to at least one of the upper and lower endcaps 13,50 of the film chamber 14. "Substantially adjacent" includes being spaced no more than about 0.1 millimeter from the endcap. FIG. 16B shows an instance in which both ends of the secondary cassette 24 are substantially adjacent to the endcaps 13,50. Yet another possibility is that the secondary cassette is spaced away from at least one of the upper wall and lower wall of the film chamber. "Spaced away from" means being spaced at least about 0.1 millimeter from the endcap. FIG. 16C shows an embodiment where both ends of the secondary cassette 24 are spaced away from the endcaps 13,50. Preferably, the second chamber 14 is sized such that the secondary cassette 24 fits snugly in the chamber 14.

Significantly, the DCS film can conveniently be loaded into the camera assembly 2 in the daylight. Instead of reloading the camera 2, a consumer can return the entire camera 2 to a film processor. The leftover camera may be able to be recycled by a manufacturer. If the manufacturer wishes to reload the camera, the manufacturer can follow the processes described above.

Thus, a camera assembly according to embodiments of the invention can provide multiple benefits. It allows a manufacturer to use the above-described shaft winding method to load film into the DCS camera in the daylight. In addition, the end user can reload the camera using DCS type film. Moreover, at the front end, a manufacturer has at least two film loading options available—the shaft winding method or the DCS film insertion method. Providing such selectivity to the manufacturer can be economically significant. For example, if a large surplus of DCS type film is on hand or if a manufacturer is able to purchase DCS film at a favorable price, then the manufacturer may wish to load the cameras with DCS type film. Alternatively, if DCS film is not available or if there is a large inventory of 35 millimeter film, then a manufacturer may want to load cameras using the shaft winding method. The camera assemblies according to the invention can be selectively loaded using either method.

Aspects of the invention can be applied to a variety of camera assemblies. While particularly suited for single-use cameras, embodiments of the invention are not limited to such cameras. Further, it will be understood that the invention is not limited to the specific details described herein, which are given by way of example only, and that various modifications and alterations are possible within the scope of the invention as defined in the following claims.

I claim:

1. A method of loading film into a camera assembly comprising the steps of:
    (a) providing a camera assembly having a main body and a back cover, the back cover operatively engaging the main body so as to form in part a light-tight film casing; the light-tight film casing including a cartridge chamber and a film chamber, each of the chambers being defined in part by the main body and the back cover, the film chamber being defined at an upper end by an upper wall of the main body and at a lower end by at least an endcap assembly, the upper wall having a recess that opens to the film chamber, wherein the chambers are disposed on opposite sides of a taking lens supported on the main body,
    the endcap assembly including a plate with an aperture extending therethrough and with a shutter blade mounted thereon, wherein the shutter blade is movable between a first position, in which the aperture is substantially closed, and a second position, in which the aperture is substantially unobstructed;
    (b) providing a substantially light-tight sleeve having a proximal end and a distal end and a longitudinal axis extending therebetween;
    (c) providing a winding rod having a proximal end and a distal end, at least the distal end of the winding rod being substantially light-tightly extending into the sleeve from the proximal end of the sleeve, the winding rod being movable within the sleeve substantially along the longitudinal axis of the sleeve;
    (d) bringing the sleeve and the camera assembly together such that the distal end of the sleeve light-tightly surrounds the aperture in the endcap assembly;
    (e) moving the shutter blade into the second position;
    (f) moving the distal end of the winding rod through the sleeve and the aperture in the endcap assembly, wherein at least a portion of the distal end of the winding rod extends into the film chamber of the camera assembly such that the distal end extends into and is supported by the recess in the upper wall;
    (g) placing a film cartridge into the cartridge chamber of the camera assembly;
    (h) attaching a leader portion of film extending from the film cartridge to the winding rod;
    (i) operatively engaging the back cover with the main body so as to light-tightly enclose the film chamber and the cartridge chamber;
    (j) turning the winding rod such that at least a portion of film from the cartridge is wound into a roll in the film chamber;
    (k) disengaging the winding rod from the leader portion of film and retracting the winding rod from the film chamber and the endcap assembly; and
    (l) moving the shutter blade into the first position.

2. The method of claim 1 wherein the shutter blade is biased into the first position, whereby the step of moving the shutter blade into the first position occurs because of the bias once the winding rod is retracted from the endcap assembly.

3. The method of claim 1 wherein the endcap assembly further includes a second shutter support plate with an aperture extending therethrough, the apertures in the shutter support plate and the second shutter support plate being substantially aligned such that the winding rod can simultaneously pass through the apertures in both shutter support plates of the endcap assembly and into the film chamber, wherein the shutter blade is enclosed between the two shutter support plates such that, in the first position, both apertures are substantially closed and, in the second position, both apertures are substantially unobstructed.

4. The method of claim 3 wherein the shutter blade is biased into the first position, whereby the step of moving the shutter moving the shutter blade into the first position occurs because of the bias once the winding rod is retracted from the endcap assembly.

5. The method of claim 1 wherein the shutter support plate includes a collar substantially peripherally surrounding the aperture in the shutter support plate and extending therefrom, and the step of placing the distal end of the sleeve light-tightly about the aperture in the endcap assembly includes mounting the distal end of the sleeve to the collar.

6. The method of claim 5 further including the step of inserting a plug into the collar.

7. The method of claim 1 wherein the turning step is performed by one of hand or electric motor.

8. The method of claim 1 further including the step of disengaging a film advance wheel on the main body so as to allow the film to be wound out of the film cartridge and into the film chamber.

9. The method of claim 1 wherein the endcap assembly is removably mounted on the main body, and further including the step of mounting the endcap assembly onto the main body.

10. A method of loading film into a camera assembly comprising the steps of:

(a) providing a camera assembly having a main body and a back cover, the back cover operatively engaging the main body so as to form in part a light-tight film casing, the light-tight film casing including a cartridge chamber and a film chamber, each of the chambers being defined in part by the main body and the back cover, the film chamber being defined at an upper end by an upper wall of the main body, wherein the chambers are disposed on opposite sides of a taking lens supported on the main body;

(b) providing an endcap assembly including a first plate and a second plate, the lower end of the film chamber being defined at least in part by the endcap assembly, the second plate having an aperture extending therethrough and having a shutter blade mounted thereon, wherein the shutter blade is movable between a first position, in which the aperture is substantially closed, and a second position, in which the aperture is substantially unobstructed, the first plate including a first portion and a separate second portion, the first portion being integral with the back cover and the second portion being integral with a lower end region of the film chamber;

(c) providing a substantially light-tight sleeve having a proximal end and a distal end and a longitudinal axis extending therebetween;

(d) providing a winding rod having a proximal end and a distal end, at least the distal end of the winding rod being substantially light-tightly extending into the sleeve from the proximal end of the sleeve, the winding rod being movable within the sleeve substantially along the longitudinal axis of the sleeve;

(e) bringing the sleeve and the camera assembly together such that the distal end of the sleeve light-tightly surrounds the aperture in the endcap assembly;

(f) moving the shutter blade into the second position;

(g) moving the distal end of the winding rod through the sleeve and the aperture in the endcap assembly, wherein at least a portion of the distal end of the winding rod extends into the film chamber of the camera assembly;

(h) placing a film cartridge into the cartridge chamber of the camera assembly;

(i) attaching a leader portion of film extending from the film cartridge to the winding rod;

(j) operatively engaging the back cover with the main body so as to light-tightly enclose the film chamber and the cartridge chamber and such that the first and second portions of the first plate engage to collectively form the first plate, whereby the first plate of the endcap assembly is completed, wherein the first and second portions collectively define an aperture extending through the first plate, the aperture in the first plate being aligned with the aperture in the second plate and surrounding the winding rod;

(k) turning the winding rod such that at least a portion of film from the cartridge is wound into a roll in the film chamber;

(l) disengaging the winding rod from the leader portion of film and retracting the winding rod from the film chamber and the endcap assembly; and (m) moving the shutter blade into the first position.

* * * * *